US008560946B2

(12) United States Patent
Fugitt et al.

(10) Patent No.: US 8,560,946 B2
(45) Date of Patent: Oct. 15, 2013

(54) TIMELINE VISUALIZATIONS LINKED WITH OTHER VISUALIZATIONS OF DATA IN A THIN CLIENT

(75) Inventors: Jesse Adam Fugitt, Oswego, IL (US); Kurt David Rivard, Naperville, IL (US); Stephen Gregory Eick, Naperville, IL (US)

(73) Assignee: VisTracks, Inc., Lisle, IL (US)

( * ) Notice: Subject to any disclaimer, the term of this patent is extended or adjusted under 35 U.S.C. 154(b) by 1104 days.

(21) Appl. No.: 11/725,119

(22) Filed: Mar. 16, 2007

(65) Prior Publication Data

US 2007/0245238 A1    Oct. 18, 2007

Related U.S. Application Data

(63) Continuation of application No. 11/670,859, filed on Feb. 2, 2007.

(60) Provisional application No. 60/784,700, filed on Mar. 22, 2006, provisional application No. 60/865,786, filed on Nov. 14, 2006.

(51) Int. Cl.
*G06F 3/00* (2006.01)
*G06F 3/0481* (2013.01)

(52) U.S. Cl.
CPC ........... *G06F 3/0481* (2013.01); *Y10S 715/963* (2013.01)
USPC ................... 715/700; 715/963; 707/E17.109; 345/440

(58) Field of Classification Search
USPC ............ 715/963, 700; 707/E17.109; 345/440
See application file for complete search history.

(56) References Cited

U.S. PATENT DOCUMENTS

| | | | | |
|---|---|---|---|---|
| 6,061,062 A * | 5/2000 | Venolia | ......................... | 715/856 |
| 6,253,218 B1 * | 6/2001 | Aoki et al. | .................... | 715/201 |
| 6,320,586 B1 * | 11/2001 | Plattner et al. | ................ | 715/700 |
| 6,332,147 B1 * | 12/2001 | Moran et al. | .................. | 715/203 |
| 6,542,812 B1 * | 4/2003 | Obradovich et al. | ......... | 701/426 |
| 6,985,837 B2 * | 1/2006 | Moon et al. | ...................... | 703/3 |
| 7,039,878 B2 * | 5/2006 | Auer et al. | ..................... | 715/810 |
| 7,263,667 B1 * | 8/2007 | Hoellerer et al. | ............. | 715/782 |
| 7,421,660 B2 * | 9/2008 | Charnock et al. | ............. | 715/751 |
| 7,464,386 B2 * | 12/2008 | Millington et al. | ........... | 719/331 |
| 7,562,299 B2 * | 7/2009 | Millar et al. | ................... | 715/719 |
| 7,703,044 B2 * | 4/2010 | Graham | ........................ | 715/838 |
| 7,802,205 B2 * | 9/2010 | Bedingfield | .................. | 715/848 |
| 8,099,679 B2 * | 1/2012 | Yee et al. | ....................... | 715/825 |

(Continued)

OTHER PUBLICATIONS

IBM Technical Disclosure Bulletin, Jan. 1, 2002, NNRD45382.*

*Primary Examiner* — Boris Pesin
*Assistant Examiner* — Ece Hur
(74) *Attorney, Agent, or Firm* — Carmen Patti Law Group, LLC

(57) ABSTRACT

An apparatus in one example has: a controller having a data connector for inputting temporal data, and an item collection for providing timelines and overlays, and for providing linked visualizations of the temporal data in a timeline to other visualizations of the temporal data; and a display for displaying the timeline and overlays, and the linked visualizations. The method may have the steps of: obtaining temporal data; displaying the temporal data in at least one timeline in a web browser and in at least one other visualization in the web browser; and linking the displayed data in the at least one timeline with the displayed data in the at least one other visualization.

52 Claims, 25 Drawing Sheets

(56) References Cited

U.S. PATENT DOCUMENTS

| | | | |
|---|---|---|---|
| 8,219,551 B2 * | 7/2012 | Tirpak | 707/728 |
| 8,230,333 B2 * | 7/2012 | Decherd et al. | 715/243 |
| D674,403 S * | 1/2013 | Pearcy et al. | D14/486 |
| 8,358,452 B2 * | 1/2013 | Haas et al. | 358/504 |
| 8,386,170 B2 * | 2/2013 | James | 701/426 |
| 2002/0046125 A1 * | 4/2002 | Speicher et al. | 705/22 |
| 2002/0075322 A1 * | 6/2002 | Rosenzweig et al. | 345/835 |
| 2004/0162675 A1 * | 8/2004 | Moon et al. | 702/3 |
| 2005/0021395 A1 * | 1/2005 | Luu | 705/14 |
| 2005/0032527 A1 * | 2/2005 | Sheha et al. | 455/456.1 |
| 2005/0055625 A1 * | 3/2005 | Kloss | 715/500.1 |
| 2006/0174209 A1 * | 8/2006 | Barros | 715/764 |
| 2006/0174211 A1 * | 8/2006 | Hoellerer et al. | 715/782 |
| 2006/0238538 A1 * | 10/2006 | Kapler et al. | 345/440 |
| 2006/0265249 A1 * | 11/2006 | Follis et al. | 705/3 |
| 2006/0268733 A1 * | 11/2006 | Rhee et al. | 370/252 |
| 2006/0288011 A1 * | 12/2006 | Gandhi et al. | 707/10 |
| 2008/0082578 A1 * | 4/2008 | Hogue et al. | 707/104.1 |
| 2008/0098316 A1 * | 4/2008 | Declan | 715/764 |
| 2008/0132251 A1 * | 6/2008 | Altman et al. | 455/457 |
| 2008/0195456 A1 * | 8/2008 | Fitzpatrick et al. | 705/9 |
| 2008/0294663 A1 * | 11/2008 | Heinley et al. | 707/100 |
| 2009/0055763 A1 * | 2/2009 | Audet | 715/764 |
| 2009/0094545 A1 * | 4/2009 | Kneisel et al. | 715/771 |
| 2009/0138826 A1 * | 5/2009 | Barros | 715/841 |
| 2009/0172511 A1 * | 7/2009 | Decherd et al. | 715/207 |
| 2009/0193356 A1 * | 7/2009 | Saba | 715/801 |
| 2009/0276714 A1 * | 11/2009 | Kandlikar et al. | 715/734 |
| 2009/0281859 A1 * | 11/2009 | Isaacson | 705/8 |
| 2010/0017733 A1 * | 1/2010 | Barros | 715/766 |
| 2011/0144993 A1 * | 6/2011 | Ruby | 704/243 |
| 2011/0239149 A1 * | 9/2011 | Lazo et al. | 715/772 |
| 2011/0306396 A1 * | 12/2011 | Flury et al. | 463/7 |

* cited by examiner

TIMELINE VISUALIZATIONS LINKED WITH OTHER VISUALIZATIONS OF DATA IN A THIN CLIENT

CROSS-REFERENCE TO RELATED APPLICATIONS

This application is a continuation of U.S. Provisional Patent Application 60/784,700, filed Mar. 22, 2006, which is now U.S. Non-Provisional patent application Ser. No. 11/670,859, filed Feb. 2, 2007. Also, this application claims priority to U.S. Provisional Patent Application 60/784,700, filed Mar. 22, 2006, which is now U.S. Non-Provisional patent application Ser. No. 11/670,859, filed Feb. 2, 2007, and U.S. Provisional Patent Application 60/865,786, filed Nov. 14, 2006, each of which is incorporated herein by reference in its entirety.

FIELD OF THE INVENTION

This invention is directed to interactive, browser-based internet applications and web pages.

BACKGROUND

"Web 1.0" is the term associated with the first generation of internet browser applications and programs, along with the associated client-side software entities and server-side software entities used to support and access information using the Internet. Such Web 1.0 technologies, like most first-generation technologies, are geared more to enabling a workable system and to the capabilities of the available software and hardware platforms, rather than to creating a rich and efficient experience for the system's users. Thus, conventional Web 1.0 technologies, while efficient for machines, are often highly inefficient and frustrating for their human users.

In particular, Web 1.0 technologies operate on a "click-wait" or a "start-stop" philosophy. That is, when a user wishes to view a web page, the user must generate a request using the client-side browser software, and send that request to the server. The user must then wait for the server to respond to the request and forward the requested data. The user must further wait for all of the requested data to be received by the client-side browser software and for the browser software to parse and display all of the requested information before the user is allowed to interact with the requested web page.

This is frustrating for most users on a number of levels. First, for slow or bandwidth-limited Internet connections, obtaining all of the requested data can often take a relatively long time. Furthermore, even when the user has high-speed access to the Internet, a web page that requires data to be re-loaded or refreshed on a fairly regular basis, such as mapping web pages, sporting events scores, or play-by-play web pages and the like, can cause significant delays. This is typically due to Web 1.0 requirements that the entire web page be retransmitted even if no or only minimal changes have occurred to the displayed information.

Accordingly, the next generation of technologies used to access and support the Internet are currently being developed and collected under the rubric "Web 2.0". A key feature in the "Web 2.0" concept is to eliminate the above-outlined "click-wait" or "start-stop" cycle, by asynchronously supplying data associated with a particular web page to the user from the associated web server. The transfer occurs as a background process, while a user is still viewing and possibly interacting with the web page, which anticipates the fact that the user will wish to access that asynchronously-supplied data. A number of important technologies within the "Web 2.0" concept have already been developed. These include "AJAX", SVG, and the like.

Asynchronous JavaScript and XML, or "AJAX", is a web development technique used to create interactive web applications. AJAX is used to make web pages feel more responsive by exchanging small amounts of data between the client application and the server as a background process. Accordingly, by using AJAX, an entire web page does not have to be re-loaded each time a portion of the page needs to be refreshed or the user makes a change to the web page at the client side. AJAX is used to increase the web page's interactivity, speed, and usability. AJAX itself makes use of a number of available techniques and technologies, including XHTML (extended hypertext markup language) and CSS (cascading style sheets), which are used to define web pages and provide markup and styling information for the web pages. It also makes use of a client-side scripting language, such as JavaScript, that allows the DOM (document object model) to be accessed and manipulated, so that the information in the web page can be dynamically displayed and can be interacted with by the user.

Other important technologies include the XMLHttpRequest object, which is used to exchange data asynchronously between the client-side browser software and the server supporting the web page being displayed, and XML, RSS and other data exchange standards, which are used as the format for transferring data from the server to the client-side browser application. Finally, SVG (scalable vector graphics) is used to define the graphical elements of the web page to be displayed using the client-side browser application.

In addition to Web 1.0 and Web 2.0 technologies, an entirely different set of software technologies are used to access other data available over local area networks, wide area networks, the internet and the like. These technologies are traditionally referred to as "client-server applications", where a complex software application having a rich set of features is installed on a particular client computer. This software application executes on the client computer and is used to access, display and interact with information stored on a server that is accessed via a local area network, a wide area network, the Internet or the like. While such client-server applications allow for dynamic displays and make manipulating information easy, such client-server applications are difficult to deploy to all of the client machines, and are difficult to update.

Timelines for displaying data are known. The SIMILE project has a thin client Timeline that is interactive. However, it lacks many desirable features. For example, there is no toolbar that is able to interact with the Timeline. Also, the SIMILE timeline only supports a proprietary data format and does not ingest standard formats like RSS and GeoRSS. Once the data is read in, it does not link to other visualizations or support selection or highlighting. The ability to zoom in or out and the ability to change scales are also not included in SIMILE's Timeline.

Thus, there is a need in the art for an improved thin client environment that supports full featured timeline display of data.

SUMMARY

One embodiment of the present method and apparatus encompasses an apparatus. This embodiment of the apparatus may comprise: a controller having a data connector for inputting temporal data, and an item collection for providing timelines and overlays, and for providing linked visualizations of the temporal data in a timeline to other visualizations of the temporal data; and a display for displaying the timeline and overlays, and the linked visualizations.

Another embodiment of the present method and apparatus encompasses a method. This embodiment of the method may comprise: obtaining temporal data; displaying the temporal data in at least one timeline in a web browser and in at least one other visualization in the web browser; and linking the displayed data in the at least one timeline with the displayed data in the at least one other visualization.

BRIEF DESCRIPTION OF DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

DETAILED DESCRIPTION

Figure 1:
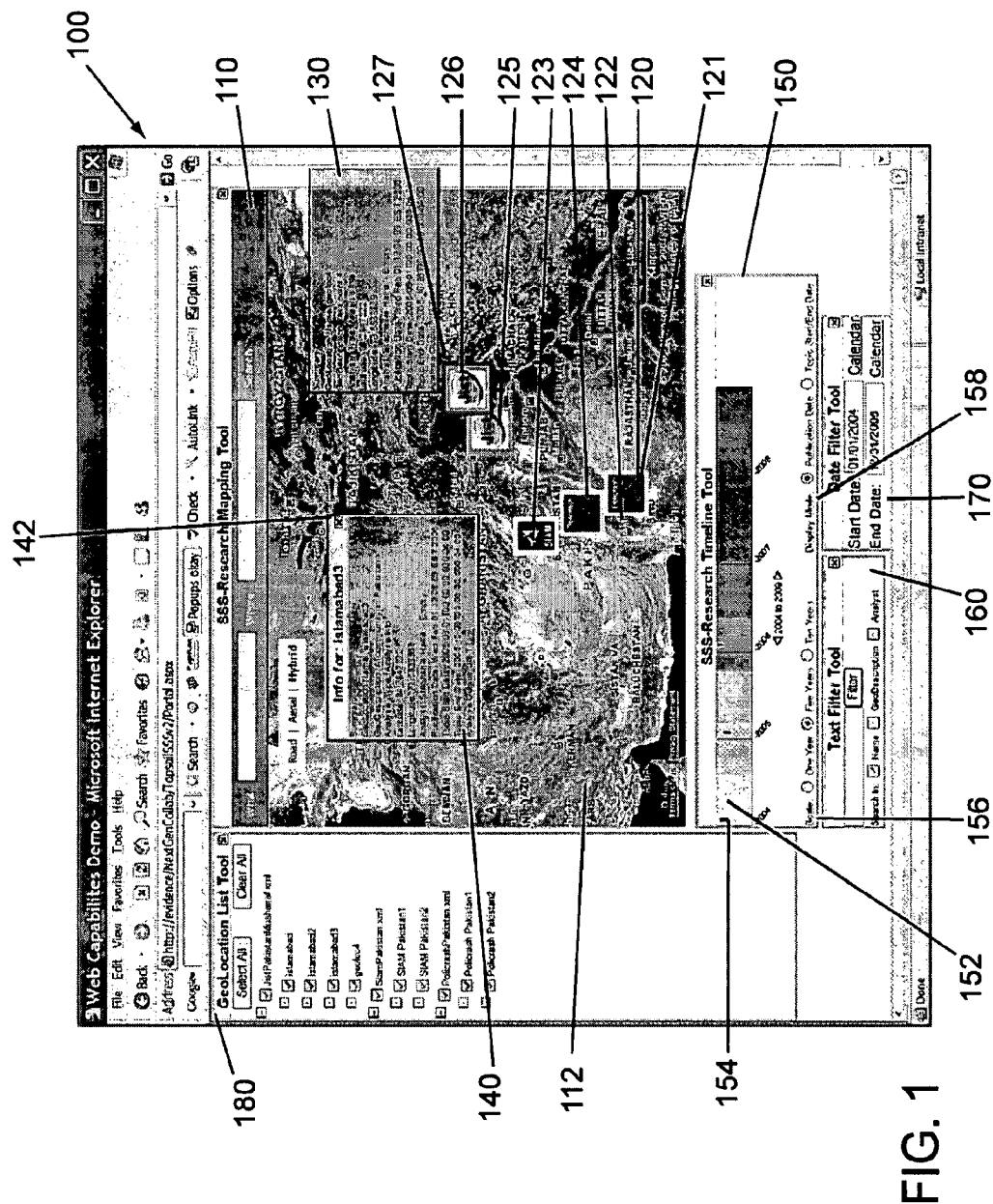
FIG. 1 illustrates one exemplary embodiment of a generic web browser and a first exemplary embodiment of a web page implementing a browser-based, collaborative information visualization.

As indicated above, traditional web applications work on a client-server model. The client, which is typically a web browser, issues a request to a server for a new page when the user clicks on, or otherwise activates, a hyperlink. The web server, which is usually Apache or IIS, does some data processing on the received request, retrieves information from various data source systems, does some additional data processing, and transmits a formatted page of hypertext back to the requesting client. In response, the requesting client receives the transmitted formatted page of hypertext, parses and renders it, and displays it to the user.

While this approach is simple technologically, it does not make much sense from the user's perspective. As indicated above, the reason for this is the inherent latency in this system between the time when the user requests a page and the time when the page is finally loaded. This latency can typically be as high as ten seconds. Because of this latency, it is not possible to use direct manipulation user interfaces, as defined in "Readings in Information Visualization: Using Vision to Think," S. Card et al., Morgan Kaufman, 1999, incorporated herein by reference in its entirety. However, as discussed in "Designing the User Interface," B. Shneiderman, Addison Wesley, 3rd Edition, 1998, incorporated herein by reference in its entirety, this class of user interfaces is greatly preferred by users.

As indicated above, the set of technologies known as Web 2.0 enables a new model that eliminates the start-stop-start-stop nature of traditional web applications. Rather, using these technologies, information is asynchronously requested and returned to the requesting browser using XML, RSS and/or any other data format that the browser is able to parse. JavaScript code in the browser parses and stores this information as it is received from the web server. This stored information can be displayed automatically or upon user request. Since the asynchronously-provided information is cached locally, the browser running such JavaScript code can provide instantaneous responses to user inputs and thereby support direct manipulation operations. Typically, JavaScript code in the browser handles interactions such as panning, zooming, scaling, and data validation. Such asynchronous requests for XML data are advantageous in that users can continue working with the web page displayed in the browser window without losing their focus and waiting while data is downloading.

Embodiments of the present method and apparatus provides a set of browser-based visual components, and systems and methods for using such browser-based visual components to provide interactive, collaborative, information visualizations within a browser. In various exemplary embodiments, the set of browser-based visual components uses AJAX (Asynchronous JavaScript and XML), SVG (scalable vector graphics) and Web 2.0 programming techniques. In various exemplary embodiments, the browser-based visual components are information visualizations that act as if they are traditional client-side application windows. However, in various exemplary embodiments, the browser-based visual components are totally browser based and require no client-installed software entities. For example, in various exemplary embodiments, the browser-based visual components do not require any additional client-side software entities to be installed for these browser-based visual components to run within the browser. Accordingly, in various exemplary embodiments, the browser-based visual components can be used across a variety of platforms, are portable to mobile devices, and enable real-time collaboration among users to a particular web site implementing the browser-based visual components.

Web interfaces are rapidly becoming the de facto standard for accessing information. As outlined above, one advantage of web-based interfaces is that they are simple to deploy relative to traditional desktop or client-side software applications. However, as also outlined above, one disadvantage of such web-based interfaces is that desktop or client-side software applications have a richness and a responsiveness that is not heretofore been possible to provide using conventional web-based interfaces. Recently, several new web applications have appeared, such as, for example, Google® Maps™, Microsoft's® Virtual Earth™ and Google® Suggest™, which provide a rich user experience when accessing web-based information that previously was only available in desktop of client-side software applications.

These applications are examples of web development that combines Asynchronous JavaScript, XML, DHTML, XSLT, RSS and/or other enabled data formats and represents a fundamental change in what is possible when accessing web-based information. For example, when accessing Microsoft's Virtual Earth™ web site, a user uses the cursor to "grab" the map and scroll or pan it past the visualization window. As another example, when using the Google® Suggest™ web page and web service, the system automatically generates suggestions for the desired search query based on the text that has previously been entered into the search query box. In both of these examples, the system's responses occur almost instantaneously, without waiting for pages to reload.

With respect to displaying map information and other geospatial information, the current technical approach is to collect the geospatial information from a variety of sources, such as satellite images, map data and the like, demographic information and the like, and combine that information to form a JPEG or GIF image on the server supporting the particular mapping/geospatial information website. The images are then sent to the client-side browser that generated the particular request as a web services stream. For example, Google®Maps™/Earth™, Microsoft® Virtual Earth™ and the like return a stream or series of tile images, in response to requests generated by the browser, to the requesting browser as the user zooms in and out, pans the image past the view window and the like. However, as outlined above, this technique requires excessive bandwidth and, when the image files are large, is slow to transmit the image files to the requesting browser. Furthermore, there is limited interaction, if any, with the information and there is no collaboration or social computing capabilities.

SVG is a World Wide Web Consortium (W3C) XML standard for two-dimensional, browser-based graphics. Using Web 2.0 programming techniques and SVG, a generic graphical user interface incorporates an interactive set of lightweight, browser-based visual components. Graphical user interfaces provide a rich desktop user experience and include many of the features found in Windows®-based client-side applications. In various exemplary embodiments, graphical user interfaces are implemented using a thin client platform that is portable to mobile devices. Thus, using the interactive set of lightweight, browser-based visual components, it is possible to develop interactive, web-based information visualizations that are browser-based and able to run in a typical standard browser or on a later-developed browser. As indicated above, this interactive set of lightweight, browser-based visual components does not require installing any additional client-side software, such as dynamic link libraries (DLLs) or client-side interpreters like the Java Virtual Machine (JVM).

These components include views, which, in various exemplary embodiments, are interactive and enable users to highlight and manipulate the data and the visualizations presented in those views. In various exemplary embodiments, the views are movable and resizable as if they were windows. In various exemplary embodiments, when multiple views present different visualizations of the same or overlapping data, the views are linkable so that selections and interactions with the data made in one view propagate to other linked views, if any. In various exemplary embodiments, the interactive set of lightweight, browser-based visual components provide tool tips and other user interface controls that are common on desktop, client-side software applications but were not previously available in web-based user interfaces. At the same time, because the components are browser-based, in various exemplary embodiments, the interactive set of lightweight, browser-based visual components are hyperlinkable and typically provide the benefits usually associated with web interfaces.

As indicated above, the interactive set of lightweight, browser-based visual components typically load the data being visualized asynchronously, without needing to interrupt any user activity. Likewise, as outlined above, the interactive set of lightweight, browser-based visual components are, in various exemplary embodiments, collaborative and provide support for real-time collaboration. As a result, edits, revisions, deletions, additions, and/or the like, made directly to the information displayed to the users and/or made to annotations or other information supplied by one of the user to a particular information collection entered by one user interacting with one browser are automatically propagated to other users using other browsers to access that same information collection.

In various exemplary embodiments, such collaboration is accomplished by enabling users to mark areas of a displayed information, such as, for example, an image, to edit such areas, to set, change, reset or otherwise modify one or more properties of such areas, to delete such areas, and the like. It should be appreciated that, in various exemplary embodiments, markable areas of the displayed information can include a region of an image, such as a region in a geographic image, a rectangle, polygon or other feature element that has been laid over an image, a hot zone and/or any other known or later-developed image region or overlaid feature or graphical element, or the like. In general, in various exemplary embodiments, such collaboration is accomplished by making it possible for a user to take any desired known or later-developed action relative to and/or against such areas that conveys information from that user to another user.

FIG. 1 shows one exemplary embodiment of a conventional browser executing a web page implementing one exemplary embodiment of browser-based visual components. In particular, the web page displayed in the browser 100 shown in FIG. 1 includes a geospatial data or information visualization window or view 110, a Timeline Tool 150, a Text Filter Tool 160, a Date Filter Tool 170 and a GeoLocation List Tool 190.

In particular, the geospatial data view 110 displays a satellite image 112 and a plurality of data icons 120. In various exemplary embodiments, the geospatial data view 110 comprises two or more independent layers of information, including, for example, an image layer and an SVG elements layer. In various exemplary embodiments, the image layer includes one or more static images, such as JPEG images, GIF images, bit-map images and/or the like. In the exemplary embodiment shown in FIG. 1, the satellite image 112 is displayed in the image layer and is typically a JPEG or GIF image supplied by some web-based mapping service, such as Microsoft®'s Virtual Earth™ or Google® Maps™. In various exemplary embodiments, the various data icons 120 are implemented in the SVG elements layer and are implemented as independent graphic objects overlaid on the satellite image 112. In particular, each data icon 120 can include one or more interactive features, such as a color-coded border 121, an activation border 127, and/or the like. Additionally, each of the various icons 122-126 has an image or graphical appearance that corresponds to the type of data and/or the information collection represented by that particular icon 122-126. A pop-up tool tip window 130 is also associated with each data icon 120.

In the particular example shown in FIG. 1, the geospatial data view 110 includes a plurality of different icons 122-126. In the exemplary embodiment shown in FIG. 1, each of the icons 122-126 includes a color-coded border 121 having a particular color. This particular color corresponds to the colors used in the Timeline Tool 150, where the date of the data item represented by those icons is color coded according to the color and coding used in the timeline visualization 152 shown in the Timeline Tool 150. Thus, for example, the color-coded border 121 around the data icon 123 has a light yellow color, indicating the date of that item is early 2004. The color-coded borders 121 around the data icons 122 and 124 have a light green-yellow color, indicating the date of those data items is late 2004 or early 2005. Finally, the data icons 125 and 126 have dark blue-green borders 121, indicating the date of the corresponding data items is late 2005 or early 2006.

In the exemplary embodiment shown in FIG. 1, the mouse cursor (not shown) is currently located over the data icon 126. As a result of mousing over that data icon 126, an activation border 127, which has a defined color, is placed around the color-coded border 121 of the data icon 126 and the pop-up tool tip window 130 associated with the data icon 126 is displayed. In particular, in various exemplary embodiments, the pop-up tool tip window 130 is displayed by adding it to the geospatial data view 110 as a transparent pop-up. Accordingly, when the mouse cursor is moved away from the data icon 126, the pop-up tool tip window 130 will be removed from the geospatial data view 110. However, if, while the cursor is over the data icon 126, the left mouse button, for example, is pressed, the pop-up tool tip window 130 is replaced by a persistent pop-up window 140. In the exemplary embodiment shown in FIG. 1, this was done while the mouse cursor was over the data icon 125. As a result, the information associated with the data icon 125 is displayed in the displayed persistent pop-up window 140, which remains displayed after the cursor is moved away from the data icon 125. In particular, the persistent pop-up window 140 will remain displayed until its close button 142 is selected.

It should also be appreciated that, in various exemplary embodiments, the user can arbitrarily zoom in and out on the satellite image 112. In various exemplary embodiments, the zoom function is linked to the scroll wheel of the mouse. Accordingly, when the mouse if within the geospatial data view 110, and the user rotates the mouse scroll wheel, the user can zoom in or out. In various exemplary embodiments, the zoom range is from world to meter level.

The Timeline Tool 150, as indicated above, includes the timeline visualization 152. Within the timeline visualization 152, a plurality of tick marks 154 are displayed. Each displayed tick mark 154 corresponds to one or more of the data icons 120 displayed over the satellite image 112 in the geospatial data view 110. Additionally, as shown in FIG. 1, the Timeline Tool 150 includes a scale selection widget 156 and display mode selection widget 158. Each of these widgets includes two or more radio buttons that allow various data selections to be made. In particular, the scale selection widget 156 includes three radio buttons that define scale for the timeline data to be displayed. In particular, in the exemplary embodiment shown in FIG. 1, these three radio buttons are displayed for a one-year scale, the displayed five-year scale, and for a ten-year scale. The display mode selection widget 158 includes a pair of radio buttons including the publication date button and the topic start/end date button. This allows the particular type of date information for the data items to be selected for displaying in the timeline visualization 152 and when displaying the color-coded borders 121.

It should also be appreciated that the satellite image 112 shown in FIG. 1 can be, in various exemplary embodiments, updated in near real time if it were being implemented with a real time geospatial server. Thus, as updated satellite image became available, the various image files used to form the satellite image 112 that contain updated image data, and only those image files, would be received from the server and used to asynchronously replace the corresponding out-of-date image files without having to download the entire geospatial image 112.

The GeoLocation List Tool 190 allows the user to select the various data item collections to be displayed within the geospatial data view 110. In the exemplary embodiment shown in FIG. 1, there are three main information collections, the "JistPakistanYusharof.XML" information collection, the "SiamPakistan.XML" information collection, and the "PolicrashPakistan.XML" information collection. Each of these information collections has a different icon appearance for the data icons 120 associated with that information collection. Accordingly, it is possible to readily determine that the data icons 125 and 126 correspond to the top information collection, the data icon 123 corresponds to the middle information collection, and the data icons 122 and 124 correspond to the bottom information collection.

The Text Filter Tool 160 and the Date Filter Tool 170 allow various filters to be applied to the various information collections to allow the user to control which data items are displayed in the geospatial data view 110. In particular, the Text Filter Tool 160 allows data items containing a particular text string to be selected for display. As shown in FIG. 1, in various exemplary embodiments, the user can use the Text Filter Tool 160 to select where the text string is to appear in the data item. Similarly, the Date Filter Tool 170 allows the user to select a date range over which the data items are selected for display. In the exemplary embodiment shown in FIG. 1, this includes a start date and an end date and includes hyperlinks to calendars that allow the user to better determine the start and stop dates that the user desires.

Figure 2:
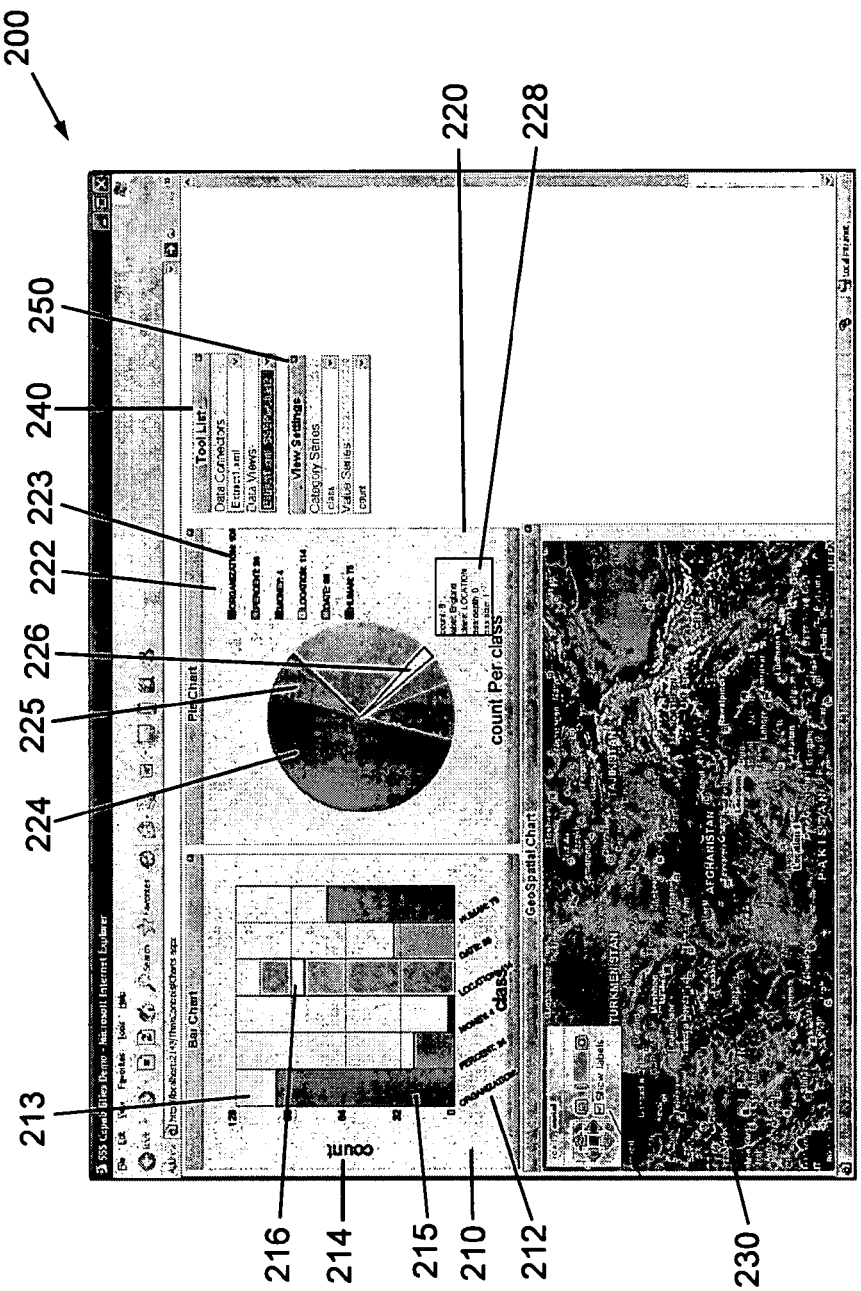
FIG. 2 illustrates the generic browser and a second exemplary embodiment of a web page implementing a browser-based, collaborative information visualization.

FIG. 2 shows a second exemplary web page implementing interactive browser-based visual components in another browser window 200. As shown in FIG. 2, the web page displayed using the browser window 200 includes a bar chart view 210, a pie chart view 220, and a geospatial data/information view 230.

As shown in FIG. 2, the bar chart view 210 includes a plurality of data item classes 212 associated with the columns 213 of the bar chart view 210 and a value axis 214 that indicates the data values associated with the various points along the columns 213. In the bar chart view 210, each of the columns 213 includes a plurality of data items 215 that are color-coded corresponding to the particular column in which they appear. Each of the data items 215 is selectable.

The pie chart view 220 includes a color-coded legend 222 that indicates the various data classes 223 and the color codes used in the pie chart 224 associated with each of those data classes 223. For example, the organization class 223 is associated with a portion of the pie chart 225 and is colored using the color code associated with the organization class 223.

As shown in FIG. 2, a particular data item 226 in the location class 223 has been selected. As a result, a tool tip pop-up window 228 is displayed in the browser window 200 and displays data associated with the selected data item 226. At the same time, the corresponding data item 216 in the bar chart view 210 is also shown selected or highlighted.

The geospatial data/information view 230 displays various types of geospatial information, including satellite images, such as that shown in FIG. 2, map data, hybrid map/satellite data, or the like. A dashboard tool 232 on the map can be used to interact with and adjust the maps settings as defined in the API of the specific map provider.

Finally, as shown in FIG. 2, the web page displayed using the browser window 200 includes a Tool List widget 240 and a View Settings widget 250. The Tool List widget 240 allows the user to dynamically select the different data connectors/collections and the corresponding views associated with that data. By selecting a specific view, like the bar chart, the user can use the View Settings widget 250 to manipulate the different axes for that chart. The x axis could be changed from "class" to "label" so that the bar chart would represent "count" per "label" in each bar instead of "count" per "class". When these tools are used to manipulate the views, the page is not refreshed because the views are able to dynamically redraw themselves.

Figure 3:
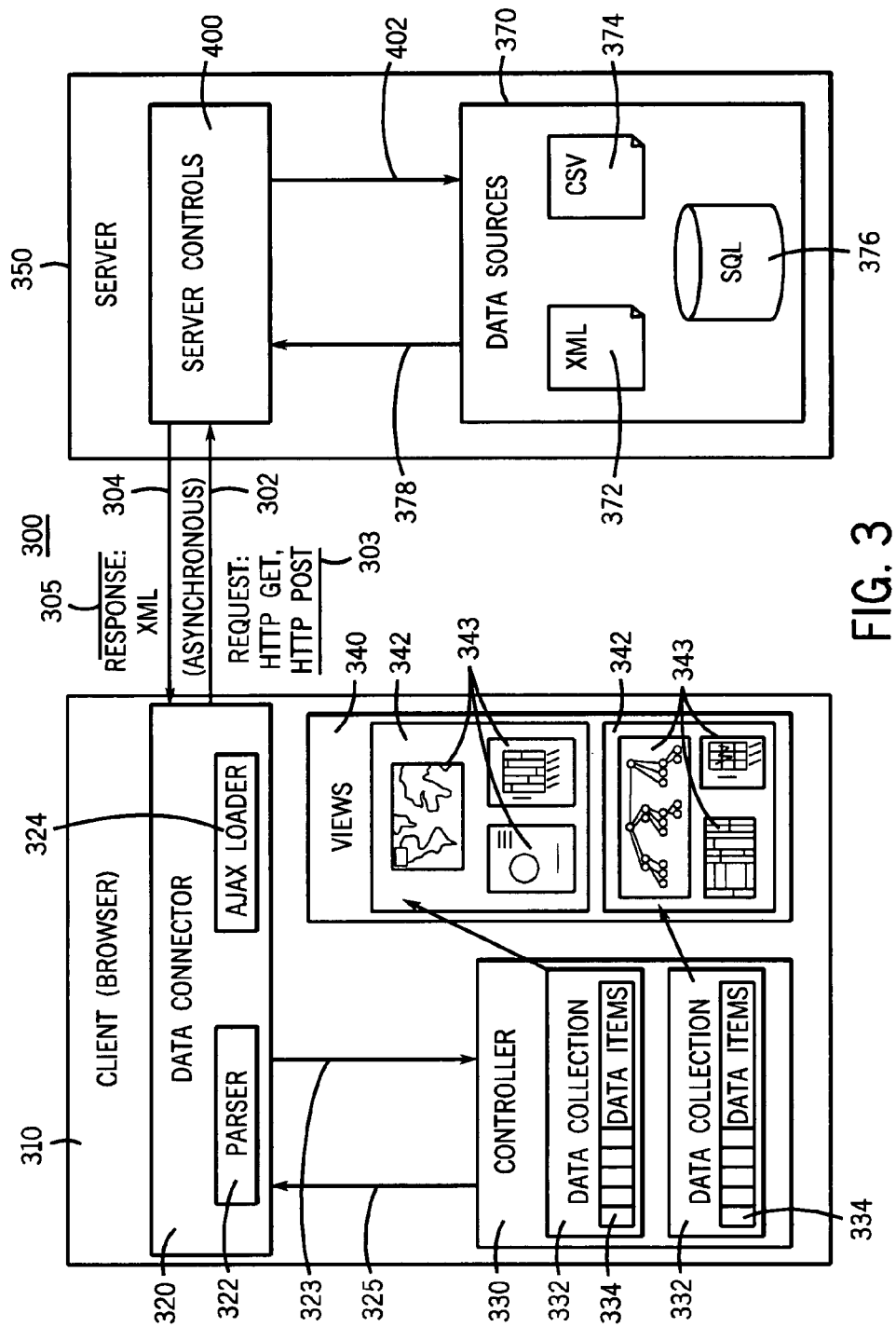
FIG. 3 illustrates one exemplary embodiment of a client-side browser-based interactive web page and one exemplary embodiment of a server-side web site architecture.

FIG. 3 shows one exemplary embodiment of client-side and server-side functional architectures of exemplary client-side and server-side systems. It should be appreciated that the server-side systems are, in various exemplary embodiments, designed to receive data from a variety of data sources, such as corporate image repositories, mission critical image content, web content, and/or geospatial collection systems. In contrast, the client-side systems are, in various exemplary embodiments, designed to create information visualizations from those data sources that are appropriate for, for example, one or more of cell phones and other mobile devices, PDAs and other web-enabled devices, tablet computers and laptop computers, as well as desktop computers.

As shown in FIG. 3, in various exemplary embodiments, the system 300 includes a client-side browser-based system 310 and a server-side system 350. In particular, the client-side or browser-based system 310 outputs various requests 303, such as "http get," "http post," or similar messages, asynchronously over a communication path 302 to the server-side system 350, while the server-side system 350 sends various responses 305, such as XML messages, RSS feeds or the like, over a communication path 304 to the client-side or browser-based system 310. As shown in FIG. 3, the client-side or browser-based system 310 includes a data connector component 320, a controller component 330 and a view component 340 containing one or more views 342. In various exemplary embodiments, the data connector component 320 is a browser-based, JavaScript component that asynchronously requests, receives and parses XML data. While previous Web 1.0 approaches use a "click-wait" style of programming, the data connector component 320 uses AJAX programming techniques and asynchronous data loading. In various exemplary embodiments, the data connector component 320 includes a Parser 322 and an AjaxLoader 324. When loading data, in various exemplary embodiments, the AjaxLoader 324 issues an "XMLHttpRequest" and immediately returns programming control to the user interface thread, rather than pausing for the data to arrive, as in the previous Web 1.0 approach.

When the XML data 305 eventually arrives over the communication path 304 from the server-side system 350, the data connector component 320 inputs the XML data via the AjaxLoader 324 and provides it to the Parser 322. The Parser 322 parses the XML data and provides it to the controller component 330. As a result, the data connector component 320 allows this data loading to occur as a background asynchronous process. As indicated above, this allows a better user experience, because the user does not need to wait for the response 305 to arrive over the communication path 304 from the server-side system 350. The response is also processed without a consciously-issued request by the client-side or browser-based system 310 in response to direct user control. Moreover, the data connector component 320 allows for more efficient use of network resources, since this architecture enables lower performance networks to be run at higher utilization rates by returning only the specific data information that is needed, rather than an entire html web page for every request.

Once the data connector component 320, and particularly the Parser 322, outputs the parsed data 323 to the controller component 330, the controller component 330 stores the parsed data in one or more information collections 332. In various exemplary embodiments, each information collection 332 is a memory-resident, table-like data structure that is associated with one set or type of data. Thus, each different set or type of data will be stored using a separate information collection 332. Each separate item of data will be associated with a separate data item 334 in the particular information collection 332. As shown in FIG. 3, in various exemplary embodiments, each information collection 332 can be associated with zero to many particular visual components 343. In various exemplary embodiments, each information collection object 332 holds information about each data item 334 stored inside that information collection 332, as well as any references to the visual components 343 of the particular views 342 that are associated with that information collection 332. Other types of information 334 stored in each information collection 332 include linking, tool tip, and state information. It should also be appreciated that the controller component 330 is connected to the data connector component 320 by a communication path 325, which allows it to send and receive requests to the server as needed.

As indicated above, the view component 340 comprises one or more views 342, where each view 342 includes one or more visual components 343 that implement a particular information visualization. As outlined above with respect to FIGS. 1 and 2, the visual components 343 each provide different visualizations of the data items 334 that comprise the information collection 332 that is associated with that particular view 342. Thus, as outlined above with respect to FIGS. 1 and 2, selecting a particular data item displayed in one of the visual components 343 causes that item in the other visual components 343 of that view 342 to be selected as well.

In various exemplary embodiments, the visual components 343 implemented in the various views 342 of the view component 340 are sets of standard charts, such as bar charts, pie charts, line charts and the like, maps, such as street maps, geospatial image data, topographical maps and the like, and other custom visualizations that display data. Many of the visual components 343 are written using SVG. In particular, each of the visual components 343 displays data using its own visual metaphor. As indicated above, visual components 343 that point to the same information collection 332 are linked. Thus, interactive operations, such as for example, tool tips, selections, and highlighting, are automatically propagated from one such linked visual components to the other linked visual components that are attached to the same information collection 332.

It should be appreciated that, in various exemplary embodiments, the client-side or browser-based system 310 uses a model-view-controller design pattern, so that new visual components 343 may be easily instantiated and/or deleted at run time. As further shown in FIG. 3, the server-side system 350 comprises server controls 400 that are connected to the data connector component 320 via the communication paths 302 and 304. The server controls 400 are also connected to a plurality of data sources 370 via a communication path 402. The server controls 400 output data requests over the communication path 402 to the various data sources 370. It should be appreciated that, in-various exemplary embodiments, the data sources 370 can include one or more of XML data 372, RSS data 373, CSV data 374 and database data stored in SQL databases 376 or other database formats. The various data sources return the requested data over the communication path 378 to the server controls 400.

Figure 4:
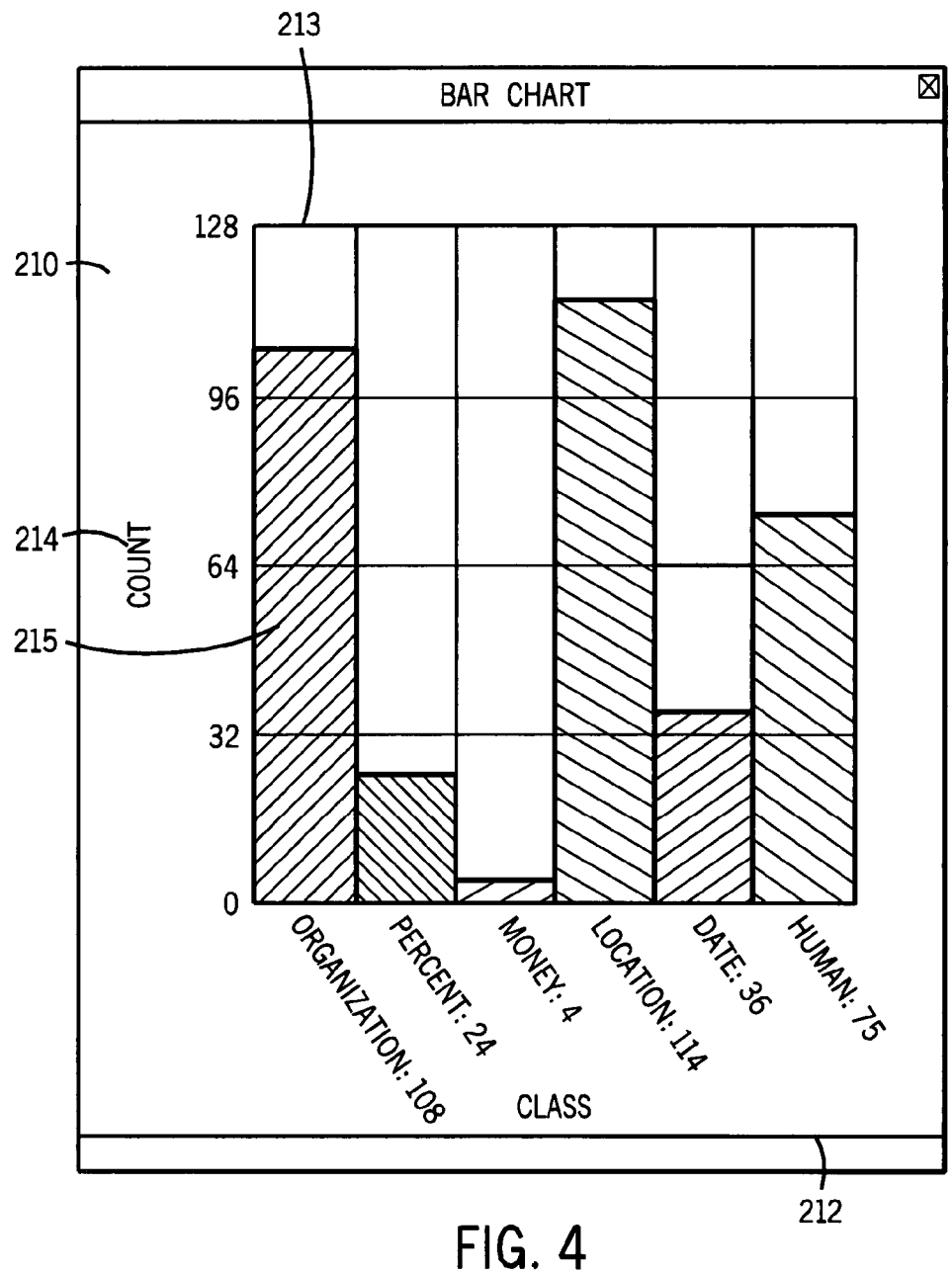
FIGS. 4-7 illustrate four different browser-based interactive information visualization views.
Figure 5:
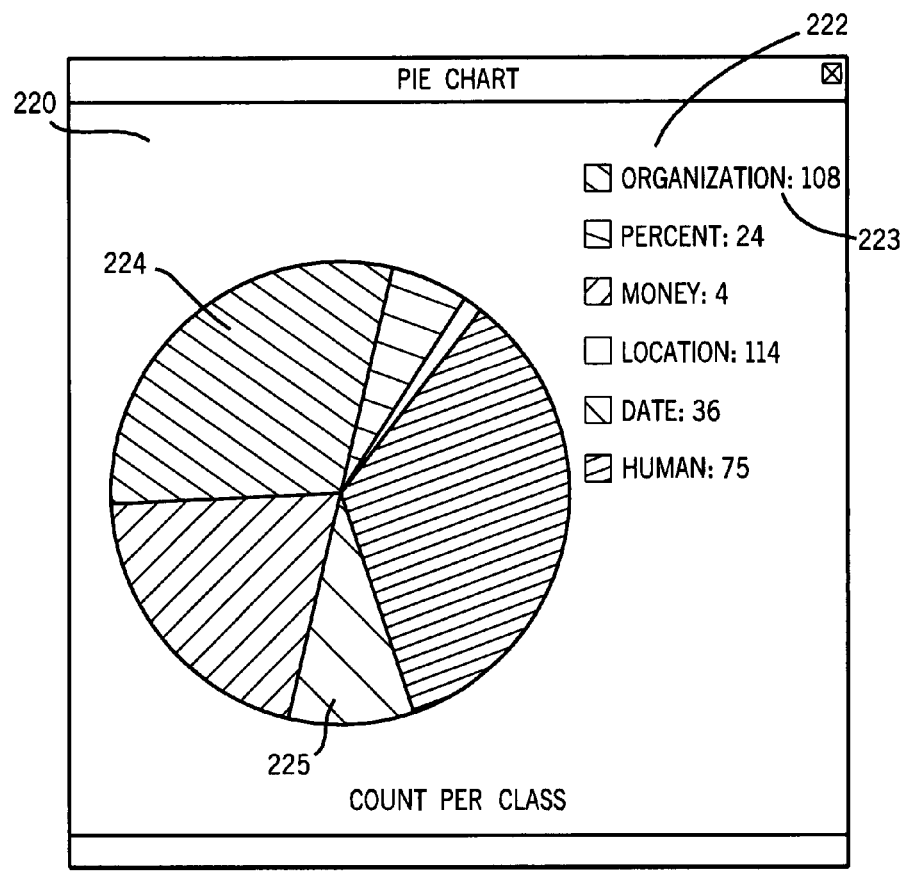
Figure 6:
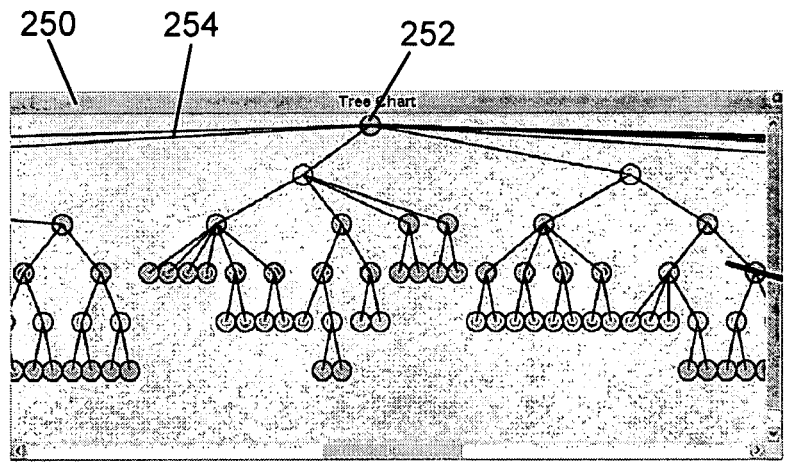
Figure 7:
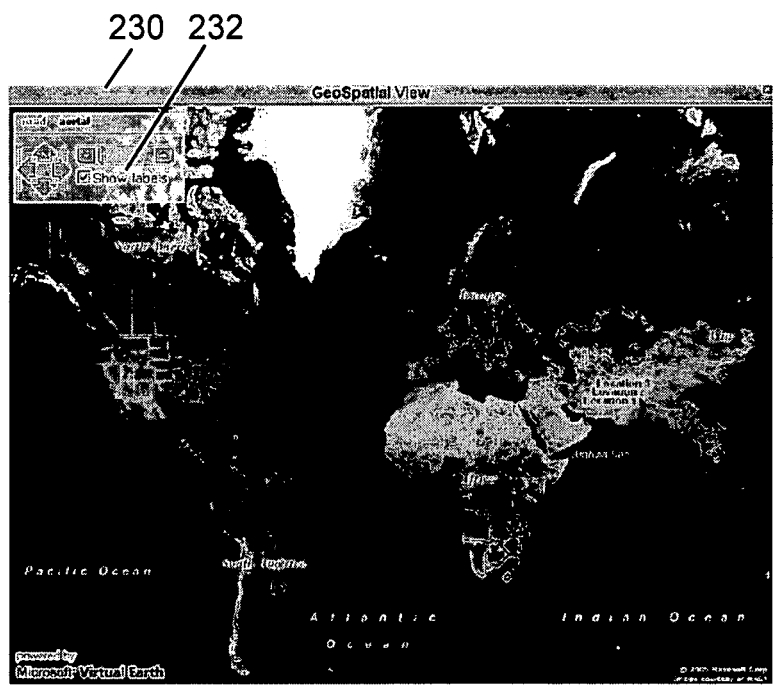

FIGS. 4 and 5 show the bar chart view 210 and the pie chart view 220 shown in FIGS. 2 and 3 in greater detail. FIGS. 6 and 7 show in greater detail additional ones of the various visual components 343 shown in FIG. 3. In particular, FIG. 6 shows a tree chart view 260. This tree chart view 260 includes a plurality of nodes 262 that are connected by a plurality of links 254 in a tree structure. In various exemplary embodiments, each of the nodes 262 at a different level within the tree is provided with a different color encoding. Thus, the root node 262 will have one color, while the next level child nodes 262 will have a different color. Subsequent child nodes 262 will have a different color, while the leaf nodes 262 will have yet another color.

FIG. 7 shows yet another exemplary embodiment of the geospatial view 230 and the dashboard tool 232 that is associated with the geospatial view 230.

Figure 8:
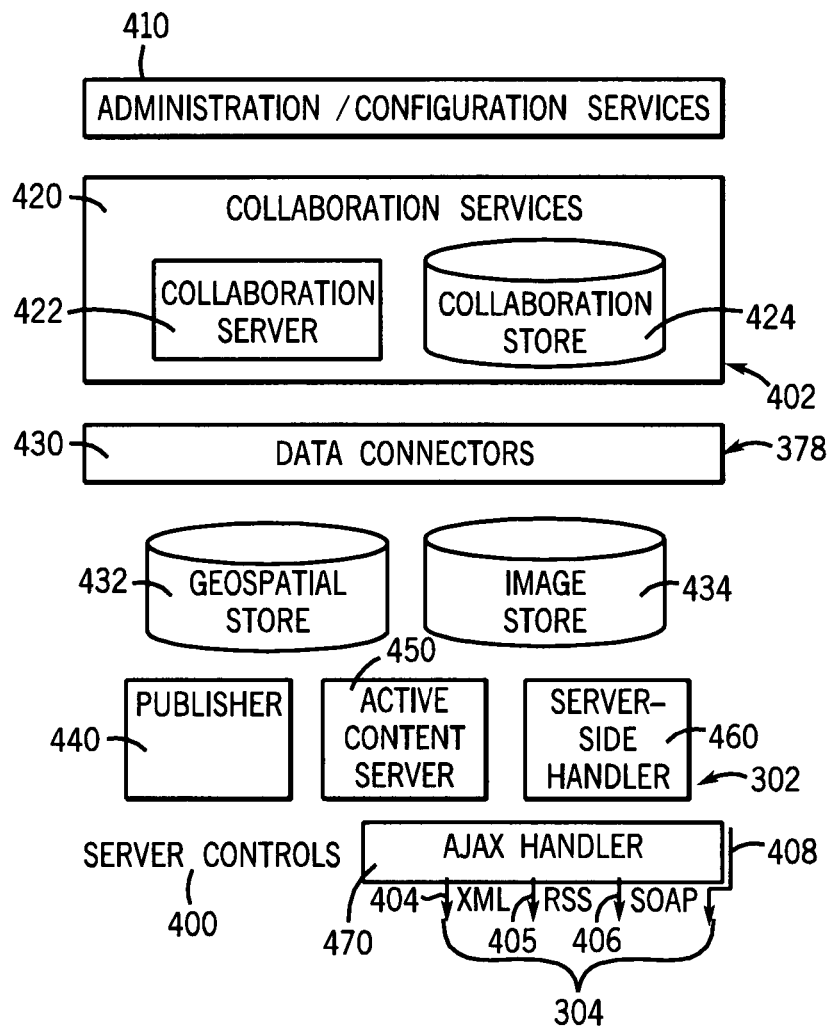
FIG. 8 illustrates in greater detail one exemplary embodiment of an architecture of server-side web site server controls.

FIG. 8 shows one exemplary embodiment of the server controls 400. As outlined above, the server controls 400 use data from various data sources 370. In particular, it should be appreciated that various ones of these data sources 370 can be legacy systems. In various exemplary embodiments, the server controls 400 input this data from the legacy systems and organize it into XML data. The server controls 400 then output the XML data over the communication path 304 as XML data to the data connector component 320. It should be appreciated that small changes in the legacy data can cascade into large user interface changes. To avoid this problem, the server controls 400 uses a software engineering "provider pattern" as disclosed in "Design Patterns: Elements of Reusable Object-Orientated Software", R. Gamma et al., Addison-Wesley 1994 (incorporated herein by reference in its entirety), that decouples the user interface from the data sources.

As shown in FIG. 8, in various exemplary embodiments, the server controls 400 include administration/configuration services 410, collaboration services 420, data connectors 430 that connect various data stores, such as a geospatial data store 432 and/or an image store 434 to the data connector component 320, a publisher 440, an active content server 450, a server-side handler 460 and an AJAX handler 470. In various exemplary embodiments, the administration/configuration services 410 handles basic user information, such as the ability to add, change, view or delete a user profile and the like. The administration/configuration services 410 are used when initially installing and configuring the server controls 400. The administration/configuration services 410 are also used by the system administrator for ongoing administrative functions. The administration/configuration services 410 also handle basic authentication, multi-level security, and user rights. Finally the administration/configuration services 410 provide the interface to the configuration parameters in all of the other components of the server controls 400. In various exemplary embodiments, the administration/configuration services 410 can also interface with a customer's external security service product via an application programming interface.

In various exemplary embodiments, the collaboration services 420 handle coordination of all collaboration features. The collaboration services 420 communicate with the administration/configuration services 410 to create a user authority, user status and user activity. The collaboration services 420 also control services like chat, whiteboard, drawing and/or annotation, or the like. For example, if one active user in an active group annotates a particular visual component 343, the collaboration services 420 propagate the new information to all other active users within that active group, such that that particular annotated visualization in the other active users' browsers is updated to contain that annotation. The collaboration services 420 are also used to signify which user has added which annotation to which visualization.

As shown in FIG. 8, in various exemplary embodiments, the collaboration services 420 include a collaboration server 422 and a collaboration data store 424. That is, in various exemplary embodiments, the collaboration services 420 are implemented using a separate collaboration server 422 and collaboration data store 424. This allows more efficient communication with the client-side or browser-based system 310 running on the various users' machines by separating collaboration data communications from the data being communicated over the communication paths 302 and 304.

The data connectors 430 act as the source for access to external data via the communication paths 402 and 378 between the server controls 400 and the external data sources 370. In particular, in various exemplary embodiments, the data connectors 430 are designed to be data-type independent. Thus, the data connectors 430 have the ability to interface with structured and/or unstructured data. In various exemplary embodiments, the data connectors 430 are based on XML and interface with the internal geospatial data model stored in the geospatial data store 432. In various exemplary embodiments, the data connectors 430 are able to continue processing data if one of the data sources 370 becomes inactive or unexpectedly terminates. The data connectors 430 also have a full application programming interface designed to integrate with legacy or proprietary data sources 370. As indicated above, the data connectors 430, upon receiving data from the various data sources 370 over the communication path 378, store the received data in one or more various internal data stores, such as the geospatial data store 432 and/or the image store 434.

The publisher 440 inputs or receives data images and other information from the data connectors 430 and deconflicts, persists, normalizes and/or validates the data and other information prior to outputting the data and other information to the data connector component 320 over the communication path 304. The publisher 440 processes received data based on a set of rules that are fundamental to the publisher 440, along with rules that can be defined for the particular web site and web pages being developed. These added rules can add, delete, modify, change and/or enhance data received by the publisher 440 based on specific web site or web page-dependant requirements.

The active content server 450 is an entity that is used in conjunction with the publisher 440 when the publisher 440 needs to actively send out updated information. This is most important when the user is viewing data that needs to be updated frequently in a real-time manner or when the user is collaborating with other users. The active content server 450 will help the publisher 440 to determine what data has been updated recently on a per user basis and thus should be sent to the user's browser so the data and visualization components can be updated.

The active content server 450 is also used to keep the displayed web page in the geospatial data view 110 updated as the client-side AjaxLoader 324 frequently polls the server controls 400 for updates. In a conventional publishing server architecture, when the user opens a web page, the browser requests information from the publishing server. The publishing server is only responsible for transmitting the information to the requesting browser once. The end user will see the same data on the page until the end user clicks on the refresh button, no matter how long that end user displays that web page.

In contrast, when using systems or methods, when the user opens a page, the AjaxLoader 324 requests information from the active content server 450. The AjaxLoader 324 will poll the server controls 400 every few seconds to simulate a server-side "push" effect for the end user. The active content server 450 will handle each request from the AjaxLoader 324 and determine if there have been new updates to the information collection that is being viewed using the client-side or browser-based system 310. If there is new data, the active content server 450 will send only the new or changed data to the data connector component 320 and the particular visual components 343 of the view component 340 that are linked to the information collections 332 storing that data will be automatically updated. If there is no new data, then the active content server 450 will not send anything back to the data connector component 320 and the visual components 343 will remain as they are.

Accordingly, it should be appreciated that the active content server 450 has quite a bit more responsibility than a conventional publishing server. The active content server 450 desirably needs to somehow "know" what "new data" is and specifically the particular "new data" that the active content server 450 should send in response to the requests from a particular AjaxLoader 324 that are received every few seconds. In various exemplary embodiments, this can be accomplished by maintaining a timestamp on the data, by applying some type of hash lookup to determine what is old data and what is "new data", or any other appropriate known or later-developed technique. The active content server 450 should also have a timeout period, such that, when a particular client-side or browser-based system 310 has not done anything for some amount of time, the active content server 450 knows that it can stop sending data. This can avoid overloading the active content server 450 with unneeded requests.

In an active publishing environment, the client browser has to be configured differently and the publishing server needs to be configured differently to make it "active". The physical hardware used to implement this can vary. In some exemplary embodiments, two different servers are used to implement this architecture. In various other exemplary embodiments, only one server, which can be configured in different ways, is used.

The server-side handler 460 processes visualizations, analytics and other computationally intensive operations based on configuration options set using the administration/configuration services 410. For example, the server-side handler 460 would process a large visualization. The server-side handler 460 builds the visualization and parses the data for the data connector component 320. The server-side handler 460 would then output the large visualization data using the communication path 408, which is part of the communication path 304, to the data connector component 320.

The AJAX handler 470 is the web services interface component of the server controls 400. The AJAX handler 470 handles communication between the data connector component 320 using an XML communication path 404, an RSS communications path 405 and/or a SOAP communication path 406, which are part of the communication paths 304. The AJAX handler 470 can also interface with other web-based services, such as .NET/ASP or Java-based JSP services.

Figure 9:
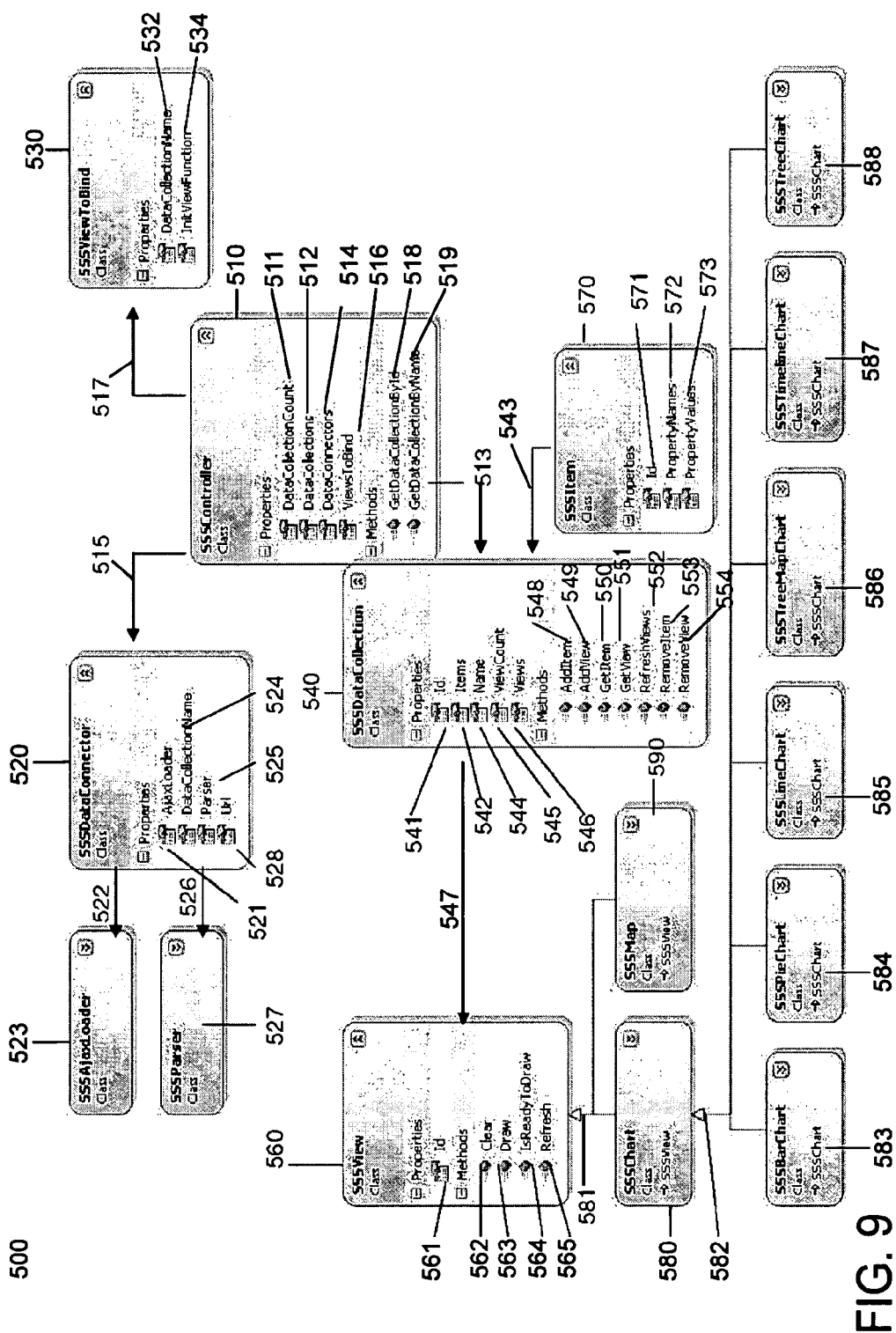
FIG. 9 illustrates one exemplary embodiment of a client-side component class diagram.

FIG. 9 is a class diagram for the various components 320, 330 and 340 of the client-side or browser-based system 310. In particular, in various exemplary embodiments, the various components 320-340 of the client-side or browser-based system 310 are organized into an object-oriented-like JavaScript library that makes these components easy to reuse and extend. Standard object-oriented properties such as inheritance, polymorphism, encapsulation and the like are implemented using JavaScript closure techniques. A model-view-controller design pattern cleanly separates the data objects from the views that are displayed in the various browser windows 100, 200 and the like.

As shown in FIG. 9, the object-oriented-like JavaScript library 500 includes a Controller object class 510, a DataConnector object class 520, an AjaxLoader object class 523, a Parser object class 527, a ViewToBind object class 530, a DataCollection object class 540, a View object class 560, an Item object class 570, a Chart object class 580, various specific chart object classes 583-588 and a Map object class 590.

As shown in FIG. 9, the Controller object class 510 includes a plurality of properties and a plurality of methods. In particular, in the exemplary embodiment shown in FIG. 9, the Controller object class 510 includes such properties as a DataCollectionCount property 511, a DataCollections property 512, a DataConnectors property 514 and a ViewsToBind property 516. Similarly, in various exemplary embodiments, the Controller object class 510 includes a GetDataCollectionByID method 518 and a GetDataCollectionByName method 519.

In particular, the DataCollectionCount property 511 indicates the total number of different information collections that are associated with an instantiated Controller object 510. The DataCollections property 512 holds an array of DataCollection objects 540, where each DataCollection object 540 is an instantiated object of the DataCollection class 540 discussed herein. Thus, the DataCollections property 512 maintains the logical connections 513 to various DataCollection object classes 540, which in turn have various logical connections to various instantiations of the View object class 560 and the Item object class 570.

The DataConnectors property 514 holds an array of DataConnector objects 520 instantiated from the DataConnector object class 520. The DataConnectors property 514 maintains the logical connections 515 to the instantiated DataConnector objects classes 520. Similarly, the ViewsToBind property 516 holds an array of ViewToBind objects 530 that maintains the logical connections 517 from the Controller object class 510 to the instantiated ViewToBind object classes 530.

The GetDataCollectionByID method 518 and the GetDataCollectionByName method 519 are used by the Controller object class 510 to initially load and regularly update the various DataCollection objects 540 either by the values of their ID property 541 and/or by their Name properties 544.

The DataConnector object class 520 includes a plurality of properties, including an AjaxLoader property 521, DataCollectionName property 524, a Parser property 525 and a URL property 528. When a DataConnector object class 520 is instantiated, the AjaxLoader property 521 causes an AjaxLoader object class 523 to be instantiated and connects it by a logical connection 522 to the parent DataConnector object class 520. Likewise, when that DataConnector object class 520 is instantiated, the parser property 525 causes a Parser object class 527 to be instantiated and connects it by a logical connection 526 to the parent DataConnector object class 520. As outlined above, the AjaxLoader object class 523 accesses a particular web page defined by the URL property 528 in its parent DataConnector object class 520. In particular, when the AjaxLoader object class 523 accesses the web page identified in the URL property 528, it specifically loads the data in the information collection specified by the DataCollectionName property 524 in its parent DataConnector object class 520. In particular, each DataConnector object class 520 points to a different web page and set of information collections found in the URL property 528 and the DataCollectionName property 524. To access a different set of information collections on the same web page or to access other information collections on a different web page, additional DataConnector objects class 520 would be instantiated and logically linked back to the instantiated Controller object class 510 by a separate logical connection 515.

The AjaxLoader object 523 asynchronously requests and receives initial and updated information from the particular information collections on the server controls 400 identified in the DataCollectionName property 524 at the web page indicated in the URL property 528 of the parental DataConnection object 520. In response, the Parser object class 527 parses the received XML, SOAP or other data from the identified website and parses or interprets the XML data so it can be used by the rest of the object-oriented-like JavaScript library 500.

As shown in FIG. 9, the ViewToBind object class 530 includes a plurality of properties, including a DataCollectionName property 532 and an InitViewFunction property 534. As outlined above with respect to the Controller object class 510 and the DataConnector object class 520, the DataCollectionName property 532 in each instantiated ViewToBind object class 530 is a string pointing to a particular DataCollection object class 540. The InitViewFunction property 534 points to a particular view object 560 that is to be bound to the particular DataCollection object 540 that is named in the DataCollectionName property 532. Thus, each ViewToBind object class 530 binds or links a particular View object 560 to the named identified DataCollection object class 540.

The DataCollection object class 540 includes a plurality of properties and a plurality of methods. It is linked by the logical connection 513 to a parental Controller object class 510 by its inclusion in the array of information collection objects within the DataCollections property 512 of that Controller object 510. In various exemplary embodiments, the DataCollection object class 540 includes properties such as the ID property 541, the Items property 542, the Name property 544, the ViewCount property 545, and the Views property 546. The DataCollection object class 540 also includes a plurality of methods, such as an AddItem method 548, an AddView method 549, a GetItem method 550, a GetView method 551, a RefreshViews method 552, a RemoveItem method 553, and/or a RemoveView method 554.

The ID property 541 is a string defining a particular ID value for the particular instantiated DataCollection object class 540. The Items property 542 is an array defining a plurality of logical connections 543 to a plurality of instantiated Item object class 570. The Name property 544 is a string containing the particular name for a particular instantiated DataCollection object class 540 that is stored in the array of information collection objects held in the DataCollections property 512 and it is linked by the DataCollectionName properties 524 and 532 to the particular DataConnector objects class 520 and ViewToBind objects class 530, respectively. The ViewCount property 545 is a string or a numeric value indicating the number of different views that are linked to the particular instantiated DataCollection object class 540. The views property 546 holds an array of View objects class 560 and maintains their logical connection 547 to the particular instantiated DataCollection object class 540.

The AddItem method 548 is used to instantiated an additional Item object class 570, while the AddView method 549 is used to instantiated an additional View object class 560. The GetItem method 550 is used to access the data associated with a particular Item object class 570, while the GetView method 551 is used to access the data and/or functions of a particular View object class 560. The RefreshViews method 552 is used to redraw and/or redisplay the various views identified in the array held in the views property 546. This would be done, for example, after a view has been manipulated, for example, by selecting a particular item or the like. The RemoveItem method 553 is used to remove or release a particular previously-instantiated Item object class 570 and to remove it from the various instantiated View objects class 560. The RemoveView method 554 is used to remove a previously-instantiated View object class 560.

As shown in FIG. 9, the Item object class 570 includes a plurality of properties, including an ID property 571, a PropertyName property 572 and a PropertyValue property 573. In particular, each ID property 571 includes a string or numerical value. The array of items held in the Items property 542 of a particular instantiated DataCollection object 540 is linked to a particular instantiated Item object class 570 using the value stored in the ID property 571 of that Item object 570. The PropertyName property 572 holds an array of data elements, such as latitude, longitude, a text string, a time and/or date, or any other data element of the particular data item associated with the Item object class 570. Each entry in the array of data elements held in the PropertyName property 572 has a corresponding entry in an array held in the PropertyValue property 573 that stores the particular value for the associated data element.

As shown in FIG. 9, the View object class 560 includes an ID property 561 and a plurality of methods, including a Clear method 562, a Draw method 563, an IsReadyToDraw method 564 and a Refresh method 565. Additionally, the View object class 560 is a parent class to both the Chart object class 580 and the Map object class 590. Each of these Chart and Map object classes 580 and 590 inherit their properties and methods from the View object class 560. This inheritance is indicated by the inheritance link 581. Furthermore, a plurality of specific types of Chart object classes, including a BarChart object class 583, a PieChart object class 584, a LineChart object class 585, a TreeMap-Chart object class 586, a TimeLineChart object class 587 and/or a TreeChart object class 588 are child classes of the parent Chart object class 580, and thus inherent from the Chart object class 580. This inheritance is shown by the inheritance link 582 shown in FIG. 9. It should be appreciated that each of the Chart and Map object classes 580 and 590, and each of the particular specific Chart object classes 583-588 have their own specific properties and/or methods that are appropriate for creating the specific types of charts and/or maps indicated.

The particular methods and/or properties included in the Chart object classes 580 and 583-588 and the Map object class 590 are conventional and thus are omitted from this disclosure. It should be appreciated that non-conventional properties and/or methods can be included in any of the Chart object classes 580 and 583-588 and/or the Map object class 590, whether such properties and/or methods are known or later developed. Like the Item object class 570, each View object class 560 is linked by the value of its ID property 561 to various DataCollection objects 540 and Item object class 570, by its inclusion in the array held in the Views property 546. The Clear method 562 removes everything from a view so that a clean representation of the data can be drawn. The Draw method 563 causes the particular view to be drawn. The IsReadyToDraw method 564 is used to query the view to determine if it is in a state that can be drawn. The Refresh method 565 is activated by the RefreshViews method 552 of the DataCollection object class 540 that is linked to the particular View object class 560 by the logical connection 547 and causes that view to be redrawn to reflect any modifications or selections of the data and/or to reflect any revised data contained in the linked Item object class 570.

Thus, FIG. 9 shows a class diagram that represents the various JavaScript classes that make up the client-side components shown in FIG. 3. By organizing these client-side components into an object-oriented-like library, these client-side components become very easy to reuse and extend. The expected object-oriented properties such as inheritance, polymorphism, and encapsulation are implemented in the various JavaScript object-oriented-like classes using JavaScript closure techniques. As indicated above, the model-view-control and design pattern cleanly separates the data objects from the views that are displayed in the various browser windows.

As outlined above, a DataConnector object class 520 is used to retrieve data from the server controls 400 and can be executed either when the requested web page is initially loaded or programmatically by other ones of the client-side components shown in FIG. 9. As shown in FIG. 9, each instantiated DataConnector object class 520 uses an associated instantiated AjaxLoader object class 523 to retrieve the data from the server identified by the URL property 528 and an instantiated Parser object class 527 to interpret the XML data that is returned in response.

In various exemplary embodiments, the AjaxLoader object class 523 is a wrapper class around a browser-specific XMLHttpRequest object to provide simple methods to execute the asynchronous data request. This AjaxLoader wrapper object class 523 is included in the DataConnector object class 520. However, in various other exemplary embodiments, the AjaxLoader wrapper object class 523 can also be used separately as needed. It should be appreciated that various different types of specific parser classes can be provided as child classes to the parent Parser object class 527.

Various ones of these child parser object sub-classes can be custom parsers that are written to interpret the received XML data. Various ones of these specific parser objects correspond to built-in generic RSS, tree, or other parsers, and are used to interpret the XML or other data that is returned from the server controls 400.

In operation, when the developer of the web page is designing the client-side components, the developer will define one or more DataConnector objects class 520 by identifying, for each different DataConnector object class 520, the particular URL which is to be accessed and from which data is to be retrieved. The web designer will also identify the particular DataCollection object class 540, in the DataCollectionName property 524, that is to be used to store the data once it has been received and parsed by the appropriate Parser object class 527. The web developer will also define one or more desired View objects class 560 that generate views to be rendered. The web developer does this by identifying, for each desired view, the desired view and the name of the information collection that should be used to populate the view in a View object 560 for each view. To link these components together, the Controller object class 510 maintains an array of the DataConnector objects class 520 and a corresponding array of ViewToBind objects class 530.

When a user loads the particular web page the web developer has created, a Controller object 510 and any needed DataConnector objects 520 and ViewToBind objects 530 are instantiated. The Controller object class 510 will be notified when each of the DataConnector objects 520 are done parsing the particular data to be retrieved from the identified URL. In response, as each DataConnector object 520 finishes parsing its appropriate data, the Controller object class 510 instantiated the necessary DataCollection objects class 540. The Controller object class 510 then instantiated the defined View objects class 560 that are identified in the various ViewToBind objects class 530 and provides the appropriate logical connections 547 from the instantiated View objects class 560 to the instantiated DataCollection objects class 540.

As indicated above, the retrieved data is stored in the Item object class 570. In various exemplary embodiments, the client-side components include the various instantiated Item object classes 570. The Item object class 570 is very flexible, in that it contains an array of property names and corresponding array of property values that are used to store the parsed XML data variables or identifiers and the corresponding values. Each instantiated Item object class 570 is associated by a logical connection 543 to a particular one of the instantiated DataCollection objects class 540. The linked DataCollection object class 540 is responsible for maintaining an array of the linked Item object class 570 and to expose methods to access and manipulate the Item object class 570. As indicated above, each instantiated DataCollection object class 540 includes an array of the views that are associated by the logical connections 547 to that DataCollection object class 540 and thus to the associated Item object class 570.

The View object class 560, and the underlying Chart and Map object classes 580 and 590 and the underlying specific Chart object classes 583-588 are written in standard browser formats, including SVG and DHTML and can be easily modified to support new technology such as, for example XAML. When changes are made to the various Item object class 570 that are associated with a particular DataCollection object class 540, the particular View objects class 560 that are associated with that DataCollection object class 540 are updated automatically to reflect the change in the Item objects class 570. In addition, when the user mousses over or selects a particular Item object class 570 that is displayed in a particular View object class 560, the other View objects 560 that are linked that particular DataCollection object class 540 and contain that particular Item object class 570 are notified, such that each such View object 560 treats that item as being selected in that view as well. The end result is a more satisfying user experience, where the user can originally analyze a specific data item using a variety of views, such as a bar chart, a pie chart, a geospatial view and the like by simply mousing over a single entry in a particular view. Similarly, patterns, outlines and the like can also be made apparent by analyzing the data using different views simultaneously.

As indicated above, the Chart object class 580 inherits from the base View object class 560. Likewise, as indicated above, specialized chart object classes 583-588, such as the BarChart object class 583, the TreeChart object class 588 and the TimelineChart object class 587, inherit from the parent Chart object class 580. This design pattern provides all the advantages and polymorphic behavior of a true object-oriented language, but is done using "closures" and JavaScript. As other specialized Chart object classes are needed, such new Chart object classes can be implemented as simply as inheriting from the base Chart object class 580, overriding the Draw method 563 in the View object class 560 and defining any additional custom methods or properties that are desired.

The Map object class 590 is a way to examine various data items contained in an Item object class 570 using a geospatial view object 560. The Map object class 590 is similar to the Chart object class 580, in that the Map object class 590 is also a dynamic, interactive View object that receives updates and notifications from an underlying DataCollection object class 540. However, like standard map objects, the Map object class 590 can also be zoomed in and out and panned, as well as able to display overlays of lines and polygons, as outlined above. It should be appreciated that, in various exemplary embodiments, any server response that returns XML data can be used to provide data to the DataConnector objects class 520. Such XML data can be retrieved from XML files, ASP.NET pages and PHP pages. This data can also include any types of proxy page database connection that accesses server data and then responds with data in an XML format. Accordingly, SOAP responses from web services would thus also be a valid source of data. By including most of the functionality in the client-side or browser-based system 310, the server requirements to output data are very flexible and easy to implement regardless of the operating system or data source.

Figure 10:
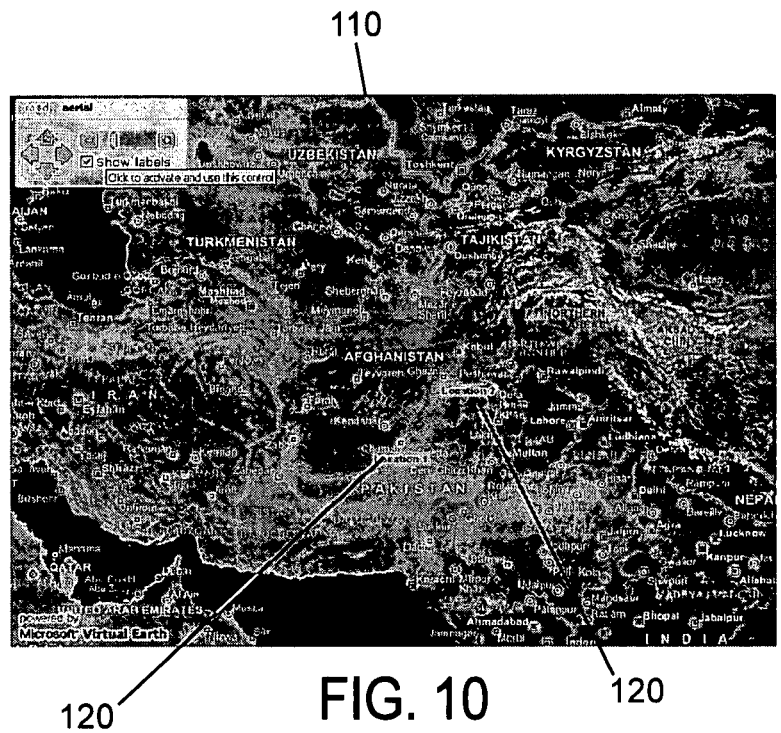
FIG. 10 shows a second exemplary embodiment of a geospatial view.
Figure 11:
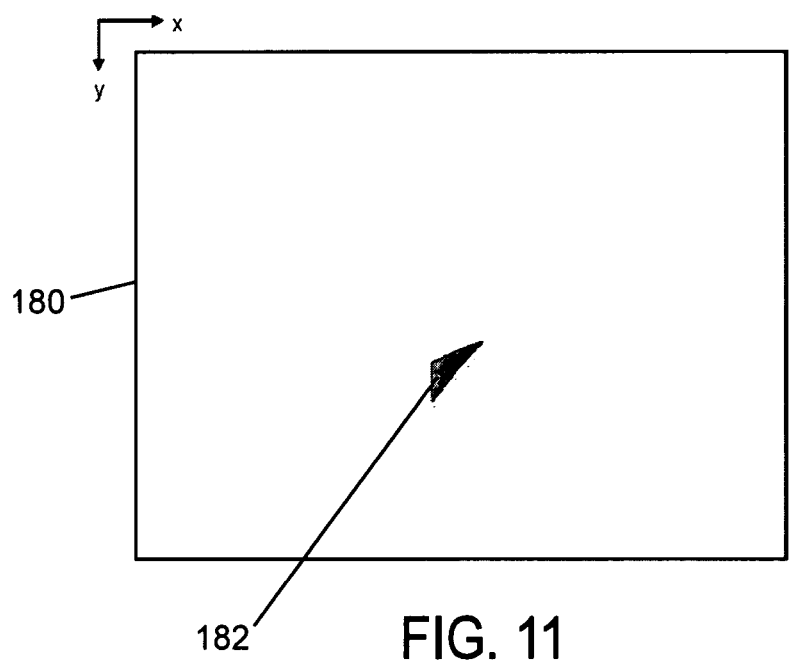
FIG. 11 shows a first exemplary embodiment of a SVG layer and SVG defined graphical element.
Figure 12:
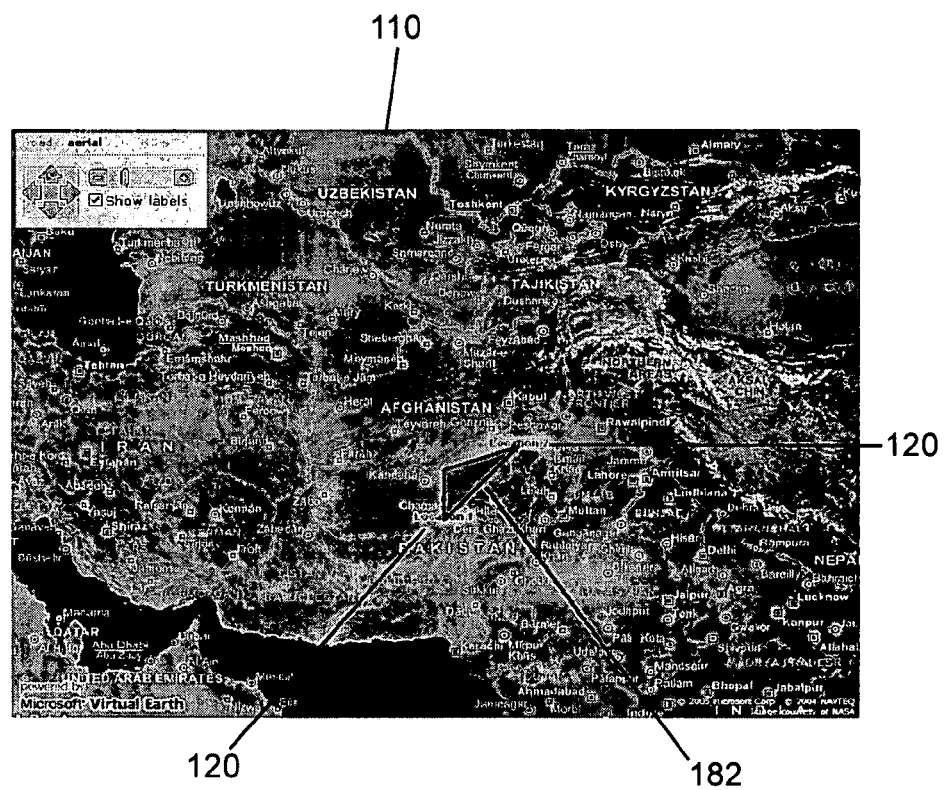
FIG. 12 shows the SVG layer shown in FIG. 11 overlaid on the geospatial view shown in FIG. 10.

FIGS. 10-12 illustrate one exemplary embodiment for combining geospatial images and SVG overlays. In particular, FIG. 10 shows one exemplary embodiment of a geospatial data view 110, such as that shown in FIG. 1. In particular, the geospatial data view 110 as shown in FIG. 10 includes a pair of data icons 120 that are embedded into the JPEG or GIF image data that is associated with the geospatial data view 110.

FIG. 11 illustrates one exemplary embodiment of an transparent SVG overlay layer 180 and a SVG graphical element 182 that is defined in the transparent SVG overlay layer 180. FIG. 12 illustrates the effect of overlaying the transparent SVG overlay layer 180, containing the SVG graphical element 182, on the image data displayed in the geospatial data view 110. In particular, as shown in FIG. 12, the SVG graphical element 182 is positioned over and relative to the data icons 120 to show the effect of some particular analysis.

In the exemplary embodiment shown above with respect to FIG. 1012, to create the transparent SVG overlay layer 180, data is imported which defines a polygon having longitude and latitude coordinates for its vertices 1-3. The latitude and longitude coordinates for these three points are 32.0°N, 66.5°E; 32.9°N, 69.6°E; and 30.1°N, 66.6°E, respectively. The geospatial data shown in the geospatial data view 110 is then analyzed to determine the x and y pixel positions within the geospatial data view 110 corresponding to the defined latitude and longitude coordinate values for the three vertices measuring from the upper left-hand corner of the geospatial data view 110. In particular, in the exemplary embodiment shown in FIGS. 10-12, the latitude and longitude coordinates for the first vertex corresponds to (x, y) position of (371, 291). The (x, y) pixel locations for the second and third vertices 2 and 3 are, respectively, (442, 267) and (371, 342). In various exemplary embodiments, these (x, y) position values are passed to a polygon drawing function, such as the "draw polygon" function, which creates an SVG graphic element in the transparent SVG overlay layer 180, resulting in the image shown in FIG. 12.

It should be appreciated that, as map events occur, such as zooming in, zooming out, panning in any direction and the like, the map is continually queried to determine the new (x, y) pixel location values for the corresponding latitude and the longitude coordinates for the vertices 1-3. In response, the updated (x, y) pixel location values are passed to the polygon drawing function, which creates a new SVG graphic element. This new SVG graphical element 182 replaces the previous SVG graphical element 182, which is removed from the transparent SVG overlay layer 180. Consequently, the SVG graphical element 182 appears to move and scale with the underlying geospatial image data displayed in the geospatial data view 110.

Accordingly, it should be appreciated that, to create the geospatial data view 110 shown in FIG. 12, a transparent SVG overlay layer 180 is placed on top of the geospatial image data in the geospatial data view 110. Then, data is imported that has been tagged with the appropriate latitude and longitude values. Based on those latitude and longitude values, the geospatial data view 110 is analyzed to determine the x and y pixel positions within the geospatial data view 110 that correspond to those latitude and longitude values. Based on those (x,y) pixel locations, points and/or shapes are drawn onto the transparent SVG overlay layer 180. As graphical user interface events that effect the geospatial data view 110 are input by the user, such as zooming, panning or the like, those graphical user interface events are caught and the geospatial data view 110 is re-analyzed to identify the new corresponding (x,y) pixel locations. The various points, shapes and other graphical elements in the transparent SVG overlay layer 180 are then redrawn. It should also be appreciated that multiple transparent SVG overlay layers 180 can be incorporated into a single geospatial data view 110 and placed over the displayed image data. These various transparent SVG overlay layers 180 can then be selectively displayed or hidden.

Figure 13:
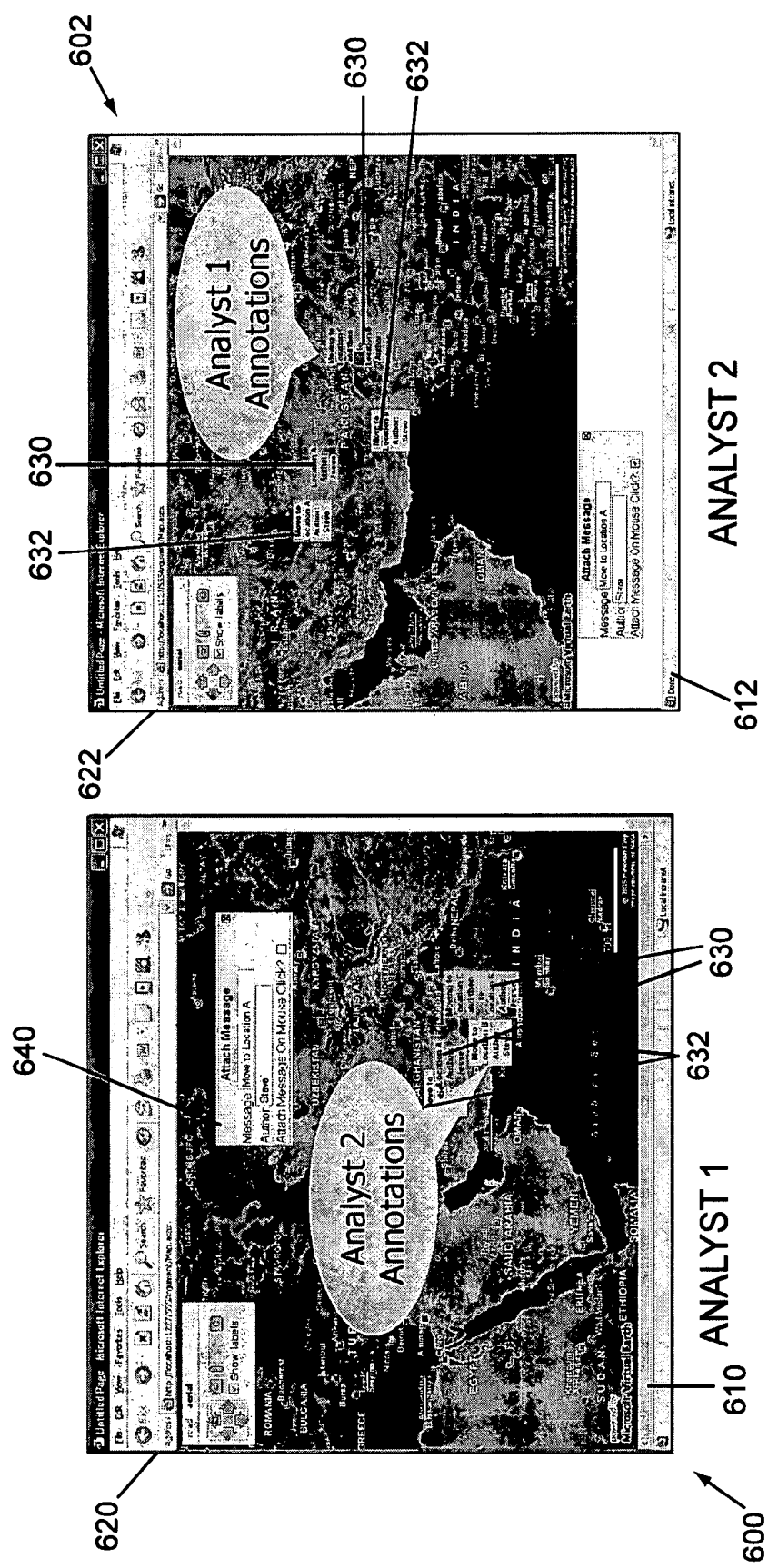
FIG. 13 shows one exemplary embodiment of a pair of users accessing the same information collection and collaboratively exchanging annotations and other user-supplied information provided relative to that information collection.

FIG. 13 illustrates one exemplary embodiment of real-time collaboration between two analysts, Analyst 1 and Analyst 2, that are each accessing the same information collection via browsers running on their separate computers. It should be appreciated that these analysts can be located near each other, such as in adjacent cubicles or even within the same room, or can be located in different buildings, in different cities, in different states, or even in different countries, in the air or at sea. As shown in FIG. 13, both Analyst 1 and Analyst 2 are viewing overlapping geospatial image data and similar, if not identical, information collections that have been geolocated relative to those geospatial images based on latitude and longitude data associated with the various information collections.

As shown in FIG. 13, Analyst 1 has opened a browser window 600 and has opened a web page containing a geospatial data view 110. In this geospatial data view 110, the Analyst 1 has displayed a first set of image data 620. While accessing this image data 620, the Analyst 1 has added a pair of annotations 630 to the various data items that are displayed in the image data 620 presented in the geospatial view 610. The Analyst 1 has also opened a message box 640 that allows the analyst 1 to add yet a further annotation. At the same time, the geospatial view 610 shows a pair of annotations 632 that the Analyst 2 has also added to the data items that appear in the image data 620 shown in the geospatial view 610. At the same time, the Analyst 2 has opened a second browser window 602 and accessed the same web site to display a second geospatial view 612 that displays a second set of image data 622. In particular, the image data 622 overlaps the image data 620 shown in the Analyst 1's browser window 600. Accordingly, the Analyst 2 sees the annotations 630 added by the Analyst 1, as well as the annotations 632 that the Analyst 2 has added himself.

Figure 14:
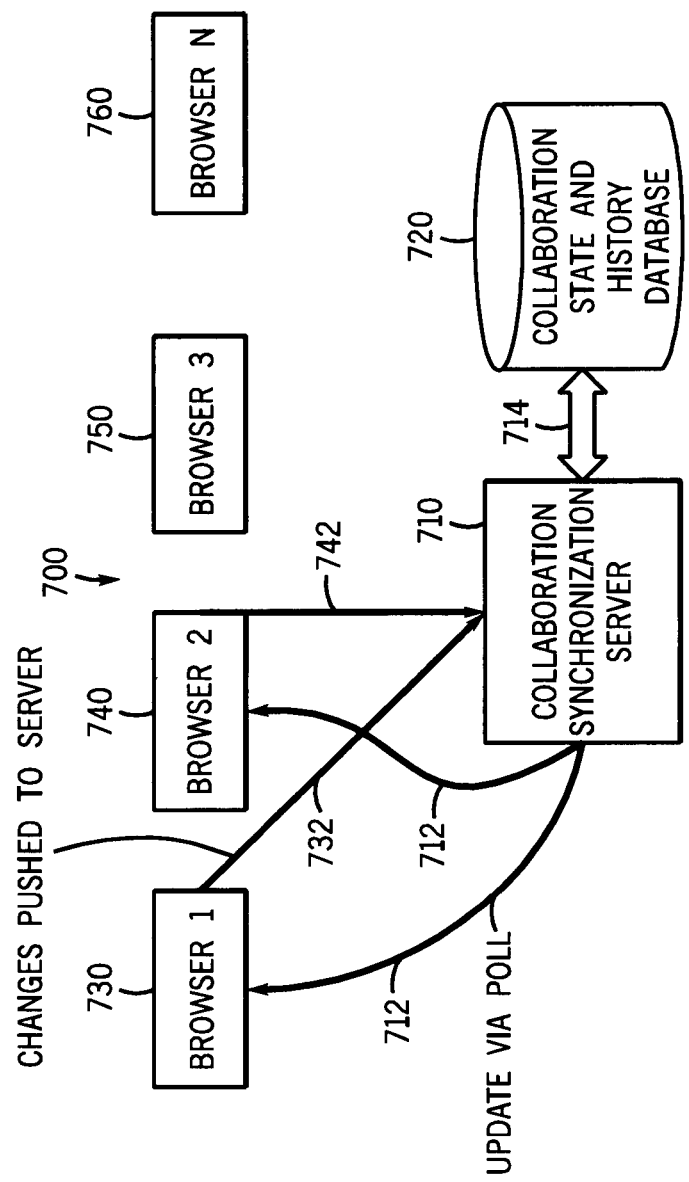
FIG. 14 illustrates one exemplary embodiment of systems and methods for exchanging annotations and other user-supplied information.

FIG. 14 illustrates one exemplary embodiment of a method for implementing this annotation structure. As shown in FIG. 14, in a particular system 700, a plurality of browser windows 730-760 have been opened. Each of these browser windows 730-760 can access a web page that contains program code. In particular, in FIG. 14, the browser windows 730 and 740 have accessed such web pages. In particular, the browser windows 730 and 740 have accessed the same web page and thus are interacting with the same information collections. In particular, the users using the browser windows 730 and 740 are collaborating by exchanging information using server controls.

As shown in FIG. 14, a collaboration synchronization server 710 communicates over a communication path 714 with a collaboration state and history database 720. The collaboration state and history database 720 allows the collaboration synchronization server 710 to know which subsets of the information collections are currently being displayed or interacted with on each of the browser windows 730 and 740, as well as the particular annotations each of the users using the browser windows 730 and 740 have entered and have received. As each of the users enters in new annotations using their browser windows 730 or 740, the data connector component 320 shown in FIG. 3, pushes annotations to the collaboration synchronization server 710 over the communication paths 732 and/or 742, respectively, using, for example, by using the AjaxLoader 324. The collaboration synchronization server 710 then stores each annotation that has been pushed down to it to the collaboration state and history database 720.

Then, each of the browser windows 730 and/or 740 sends a request using the data connector component 320, and the AjaxLoader 324 in particular, to the collaboration synchronization server 710 to asynchronously obtained updated information over the communication paths 732 and/or 742, respectively. In response, the collaboration synchronization server 710 queries the collaboration state and history database 720, for each different browser window 730, 740 or the like, to determine which annotations have already been supplied to that particular browser window 730, 740 or the like, and to determine if there are any annotations which have not been sent to that browser window 730, 740 or the like. If any such annotations exist, the collaboration synchronization server 710 receives the appropriate data for such annotations over the communication path 714 from the collaboration state and history database 720 and pushed those annotations over the communication path 712 to the particular browser window(s) 730, 740 and/or the like that have not received it. At the browser window 730, or 740, each received annotation or the like is parsed using the parser 322 and eventually displayed within the browser window 730, 740 or the like.

Accordingly, the annotations from one user, such as the Analyst 1, are automatically propagated to any other browsers such as that being used by the Analyst 2, accessing the same website and information collection. In particular, no browser refreshes or other user activity are required to push these annotations down to the collaboration synchronization server 710 or pull them back up to other ones of the appropriate browsers. It should be appreciated that, besides annotations, the types of information that can be pushed down onto the collaboration synchronization server 710 include region selections, label highlighting, or other graphical elements that can be displayed in a transparent SVG layer.

It should be appreciated that the collaboration model discussed above is a logical collaboration around the information displayed in the particular view. In particular, it is not an example of WYSIWIS (standing for "what you see is what I see"). Thus, in various exemplary embodiments, the collaboration model does not propagate exact copies of a single screen among users in the collaboration, as is done in other collaboration models, such as, for example, Microsoft®'s Live Meeting™ collaboration software (which was formally called "PlaceWare").

Figure 15:
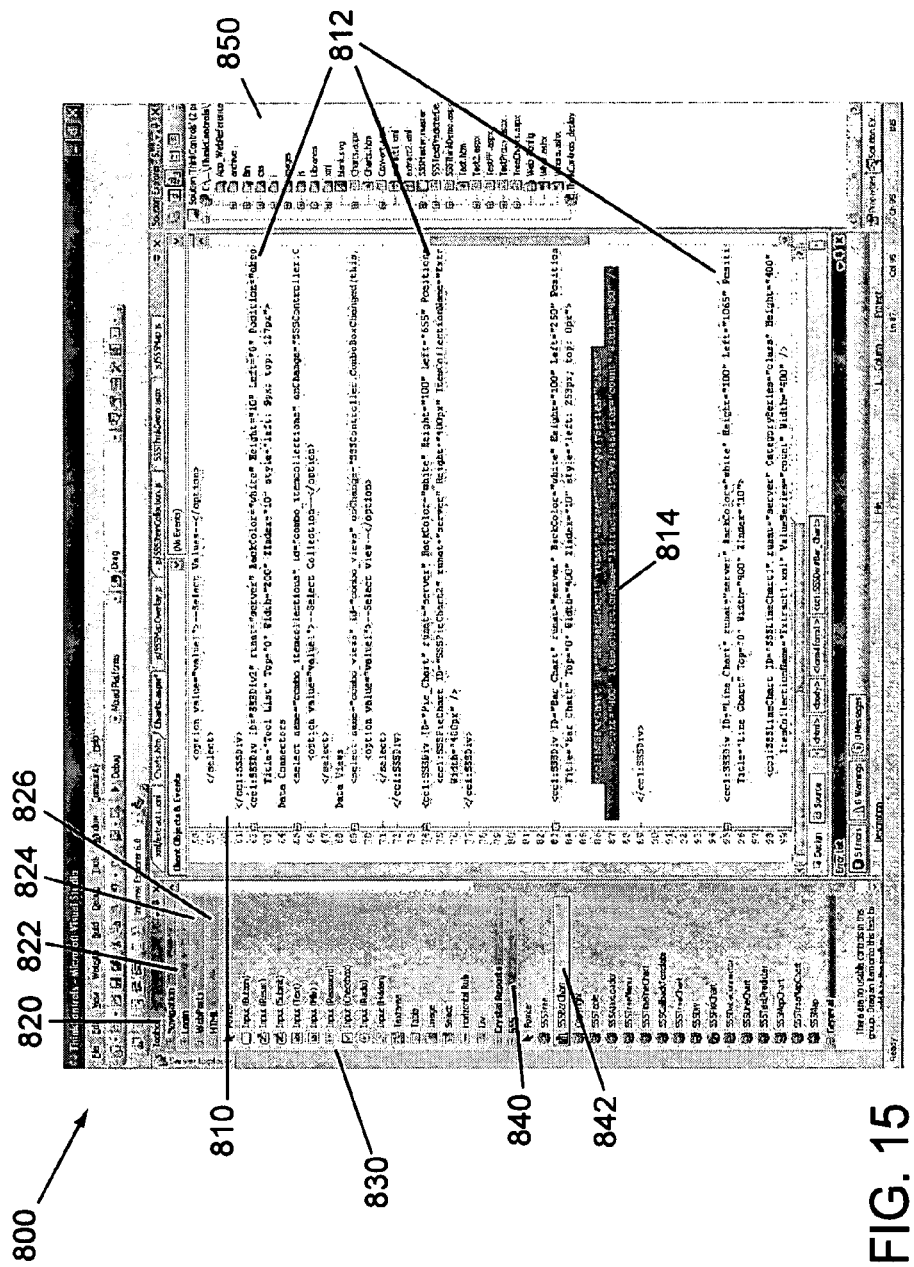
FIG. 15 illustrates one exemplary embodiment of a development environment for creating browser-based, interactive web page applications.
Figure 16:
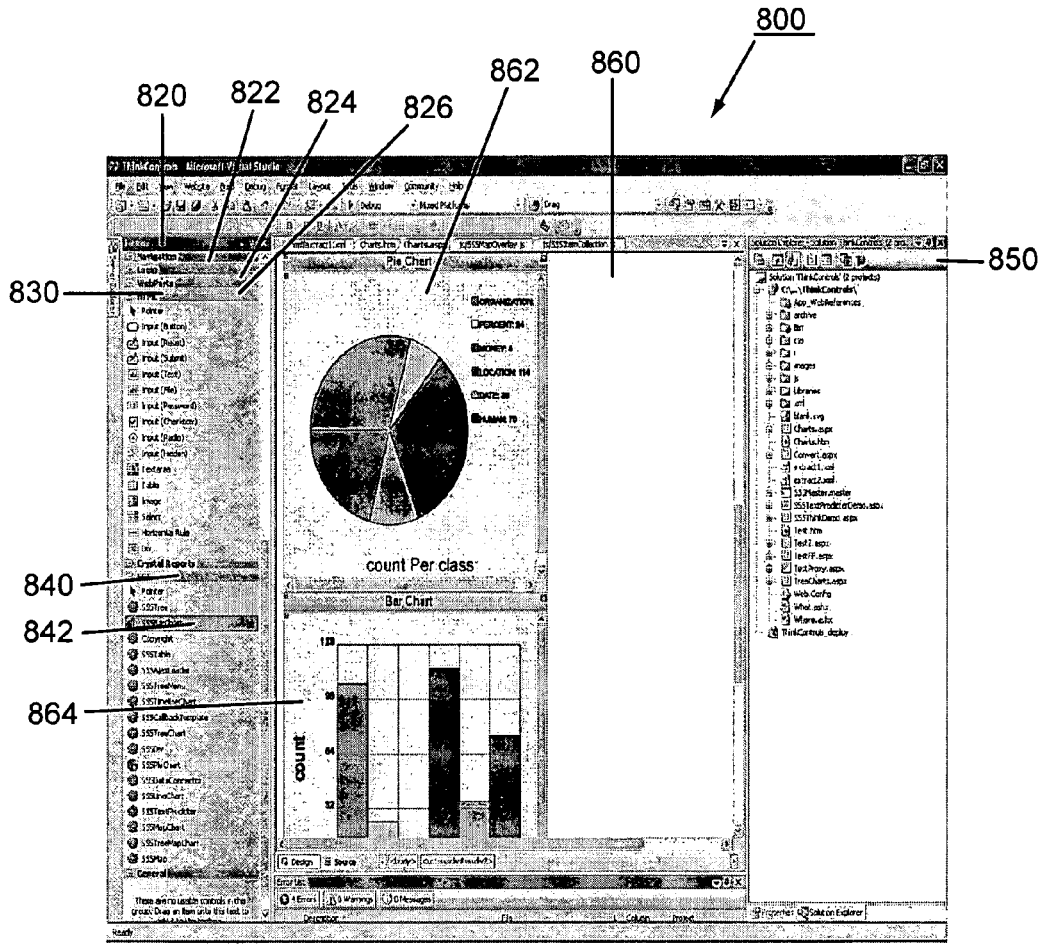
FIG. 16 illustrates a second exemplary embodiment of a development environment for creating browser-based, interactive web page applications.

FIGS. 15 and 16 show two exemplary embodiments of integrated development environments (IDEs) that have been provided with toolbars and code forms. In particular, FIGS. 15 and 16 show the same integrated development environment 800. However, FIG. 15 shows the text code elements of the web page 810 being developed, with various HTML code elements 812 being displayed. In contrast, FIG. 16 shows the same integrated development environment 800 showing the graphical elements 860 of the web page 810 being developed. Thus, in contrast to the HTML code elements 812 shown in FIG. 15, FIG. 16 shows a pair of visualizations 862 and 864 that have been added to the graphical elements 860 being developed. As shown in FIGS. 15 and 16, in both exemplary embodiments, a Solution Explorer window 850 is also displayed in the integrated development environment 800 to view the different files that make up the current project.

As shown in FIGS. 15 and 16, regardless of which representation 812 or 860 of the web page 810 is used, a tool box 820 is available to the web designer. As shown in FIGS. 15 and 16, this tool box 820 includes a Navigation tab 822, a Log-in tab 824, a Web Parts tab 826, an HTML tab 830 and a Views tab 840. Each of these tabs 822, 824, 826, 830 and 840 provide generic code structures that can be dragged and dropped into the HTML code elements 812 or the graphical elements 860 of the web page 810 and then customized for the particular website being developed. In particular, the Navigation tab 822 provides navigation controls, the Log-in tab 824 provides log-in controls, and the Web Parts tab 826 provides other web components that can be used in a web page. The HTML tab 830 provides a plurality of HTML generic code structures for adding various types of HTML entities. The Views tab 840 provides various generic code structures for various different types of view. For example, in the exemplary embodiment shown in FIG. 15, the web developer has selected the BarChart element 842 of the Views tab 840. By dragging and dropping an instance of that BarChart element 842 into the web page 810, the web developer has placed a generic code structure 814 into the web page 810 that will generate a bar chart visualization when the web page is accessed. Similarly, as shown in FIG. 16, upon dragging and dropping the BarChart element 842, the Bar Chart visualization 864 has been added to the graphical elements 860 of the web page 810 being developed in the integrated development environment 800.

In non-technical terminology, the Timeline is a tool used to visualize and interact with data all of which is accomplished in a web browser without the need to install any software. To be more specific, the Timeline visualization is a thin client, AJAX enabled view of temporal data that is interactive and linked to other visualizations, such as for example, maps and business charts. A number of important features, which may be utilized in embodiments according to the present method and apparatus, are, but are not limited to, the following: a) thin client with no software install, b) interactive panning and interactive zooming, c) different time scales, d) synchronization to other Timelines (detail and summary views), e) built in RSS support, f) linking to other visualizations, g) several data display modes, h) ability to select specific data items, i) ability to highlight specific data items, j) rich API to program against, k) built in Toolbar, l) visual scalability (overplotting), m) best fit algorithms, and n) y axis plotting (line chart capability).

The Timeline is a visualization included in the thinc Interface library. In general one embodiment according to the present method and apparatus may have the steps of: linking to a thinc Interface library in a web page; creating a new Timeline; and pointing the Timeline to one of RSS data and custom data. Software routines implement different uses of the Timeline. In one embodiment, for example, the steps may be to create the Timeline and then create data Overlays that sit on top of the Timeline, which hold the RSS data or other data that has been ingested. Several supporting classes (Controller, DataConnector, ItemCollection, Item) make it easy to point to a valid data feed and then ingest that data into the visualization. Creating other visualizations like the Map, Bar-Chart, or PieChart with the same data will automatically make the data linked between the visualizations.

The Controller, DataConnector, ItemCollection, and Items provide an easy way of getting data into the Timeline and other visualizations. There are other ways to get data into a thin client application like including the data with the page or using the browser's raw XmlHttpRequest object to retrieve the data. Regardless of how the data arrives in the thin client application, it may be used by the Timeline in a similar fashion. The Timeline itself may be instantiated by giving it a name and an element identification for where it should be placed on the page. Also, it may be given a start date, an end date, and a time scale to be used as default values when the Timeline loads up. To get data to appear on the Timeline, a new Timeline Overlay may be created and passed it the RSS or GeoRSS data. Then this TimelineOverlay may be overlayed on the Timeline.

This approach is unique and flexible because it allows multiple overlays of data to appear on the same Timeline, which can be shown or hidden by calling certain API functions. Also, the data used to populate the overlay may be automatically linked to other visualizations on the page that use the same data. Other attempts to solve this problem usually involve placing the temporal data directly in the Timeline and are usually done in a fat client application. However, often times that approach does not provide the flexibility to be able to show and hide specific data or to link the data to other visualizations.

The Timeline may also include a toolbar, which is unique, to interact with the Timeline in a variety of ways. There may be buttons to change the time scale (Year, Month, Day, Hour, Minute, Second), zoom in, zoom out, change the display mode of the data, turn labels on or off, turn date ranges on or off, and turn custom images on or off. Panning the Timeline is very intuitive and involves in one example using the left mouse button to drag the Timeline to the right or left. The Timeline may automatically generate the background as you pan without the need to refresh the page.

Multiple Timelines on the same page may be synchronized so they pan at the same rate (ex: panning one Timeline at year scale will cause a synched Timeline at month scale to pan very fast because the Timelines are being panned by a fixed amount of time rather than pixels).

A more detailed description of the unique features of embodiments according to the present method and apparatus is as follows.

a) Thin Client—The visualization runs in a simple web browser with no installation, which is a new trend in software loosely defined by principles like AJAX and Web 2.0.

b) Interactive Panning and Zooming—The old model in web pages was to click a button and have the entire page refresh to execute the pan or zoom event. The present Timeline is fully interactive and supports panning and zooming without refreshing the page. It generates new tiles for the Timeline background automatically.

c) Different Time Scales—The Timeline supports a variety of scales including: Year, Month, Day, Hour, Minute, Second.

d) Synchronization To Other Timelines—Multiple Timelines may be synchronized together on the same page so that they pan at the same rate. The lens may be drawn on one Timeline which represents the amount of time shown on the other Timeline. This technique provides a summary and detail view of the same data using two different Timelines at different scales.

e) RSS Support—The Timeline may plot any data Items, with a time dimension, but natively supports the RSS format. RSS is a common data format used in blogs and other web applications and is growing in popularity with the new GeoRSS extensions to RSS. RSS has a property called pubDate which, in one embodiment, is what the Timeline uses by default but can easily be configured to use some other property. The advantage of default RSS support is that the Timeline may be pointed at any valid blog or RSS feed and may instantly plot those blog posts on the visualization.

f) Linked To Other Visualizations—The data on a Timeline may be automatically linked to other visualizations (Map, BarChart, PieChart, etc) that display the same data. If the underlying data is changed, it will appear differently in all of the visualizations. This will be discussed more in the sections on selection and highlighting g) Data Display Modes—The data items on the Timeline may be displayed as circles, tick marks, spheres, or any custom icon. They may also display ranges if the event occurred from a start date to an end date.

h) Selection—The Timeline may support selection of data items by clicking on them or by doing a sweep rectangle select when the Timeline is in "Select" mode. This selects all the desired items and changes their display to indicate that they are selected. Every other visualization that is using the linked data will automatically change the display of those items as well. This makes the visualization unique because the end user is able to do when/where analysis using the Timeline and Map all in a standard web browser.

i) Highlighting—The Timeline may support highlighting of data items. The idea is exactly the same as selection except that items get highlighted as the user mouses over the items rather then clicking on them.

j) Rich API—The Timeline may have, in one example, a very rich API that allows developers to set a variety of properties by using the Application Programmer's Interface that may be provide. It is easy to call functions or set variables that change the look and feel of the Timeline.

k) Toolbar—The Timeline may have a built in toolbar that allows the end user to use many of the features that have been described above. The toolbar may have tooltips and buttons that are interactive but it can also be toggled off if desired.

l) Visual Scalability—When a large amount of data needs to be shown at a given date, the Timeline may have algorithms to show an "over plotting" indicator rather than stack all of the data on top of each other. This allows the end user to still see the patterns in the data and be able to zoom in further to see the data that wouldn't previously fit on the Timeline.

m) Best Fit Algorithm—The Timeline by default may use a best fit algorithm. This means that data items (including their date range, icon, and text label) will not overlap each other. If there is too much data to fit on the Timeline, then an "over plotting" indicator will be displayed.

n) Y Axis Plotting—The Timeline may be switched from Best Fit to Y Axis Plotting of the data items. This means that the data items may be plotted by using time along the x axis and some other property along the Y axis. Essentially, this turns the Timeline into an interactive Line Chart with all of the unique features of our Timeline.

Figure 17:
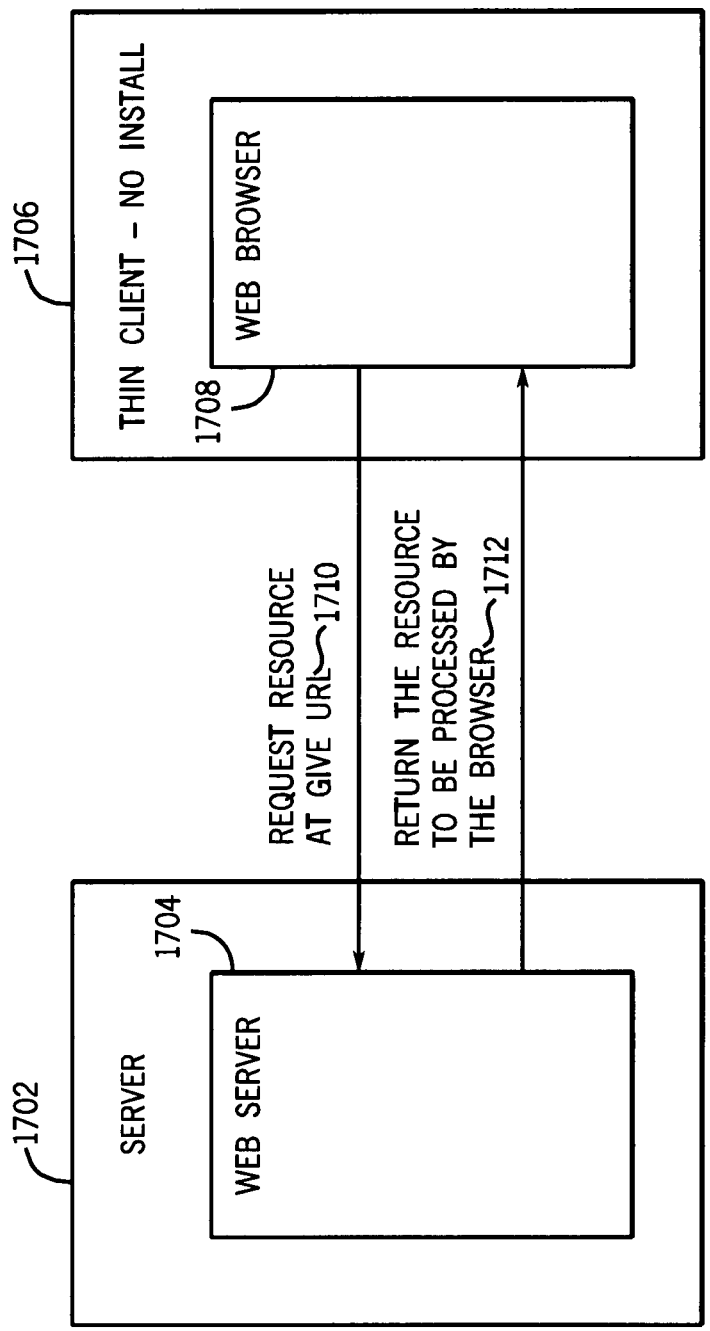
FIG. 17 is a block diagram depicting in general terms thin client architecture.

The thin client has been described above, but is shown in general terms in FIG. 17. In one embodiment a server 1702 may have a web server 1704, and a thin client 1706 may have a web browser 1708. The Web browser 1708 may send a request 1710 for a resource at a given URL. The resource is then returned in a response 1712 to the web browser 1708. The resource is then processed by the browser 1708. Since this is a thin client no software need be installed in the thin client 1706.

Figure 18:
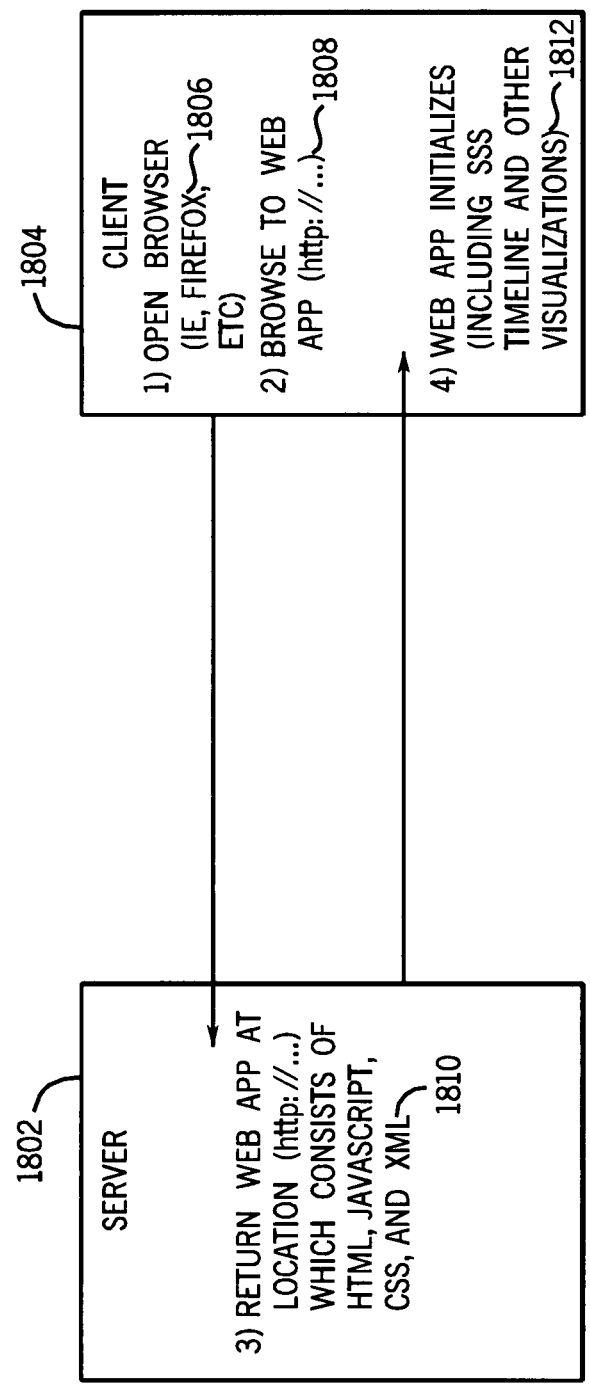
FIG. 18 is a block diagram depicting in general terms how thin client applications operate.

FIG. 18 is a block diagram depicting in general terms how thin client applications operate. In this embodiment a server 1802 is operatively coupled to a thin client 1804. In general, communication between the server 1802 and the thin client 1804 may occur as follows. A browser, such as Internet Explorer, Firefox, etc., is opened in the client 1804 (see step 1806). A brows to a web application occurs, and information is sent from the client 1804 to the server 1802 (see step 1808). The server 1802 returns the web application, which may consists, for example, HTML, JavaScript, CSS, XML, etc., to the client 1804 (see step 1810). The web application at the client 1804 then initializes which includes the Timeline visualization(s) and other visualization (see step 1812).

Figure 19:
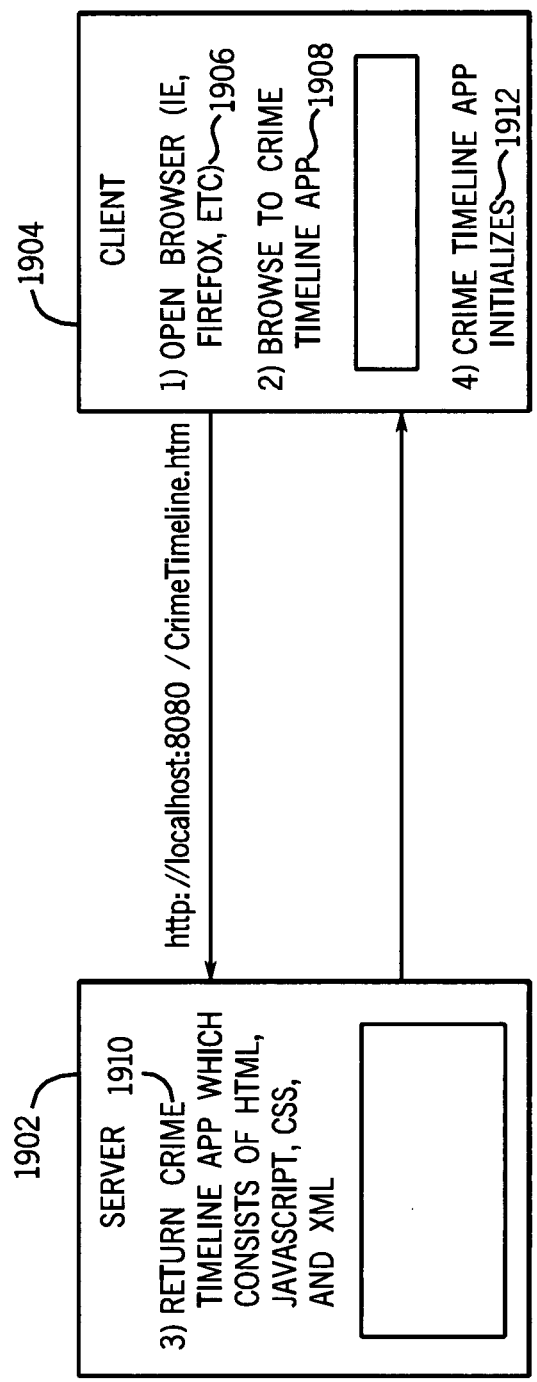
FIG. 19 is a block diagram depicting in general terms an example of how thin client applications operate.

FIG. 19 is a block diagram depicting in general terms an example of how thin client applications operate. In this embodiment, wherein crime statistics are displayed, a server 1902 is operatively coupled to a thin client 1904. In general, communication between the server 1902 and the thin client 1904 may occur as follows. A brows to a crime timeline web application occurs, and information is sent from the client 1904 to the server 1902 (see step 1908). The server 1902 returns the crime timeline web application, which may consists, for example, HTML, JavaScript, CSS, XML, etc., to the client 1904 (see step 1910). The crime timeline web application at the client 1904 then initializes which includes the Timeline visualization(s) of crime statistics and other visualization crime statistics (see step 1912).

Figure 20:
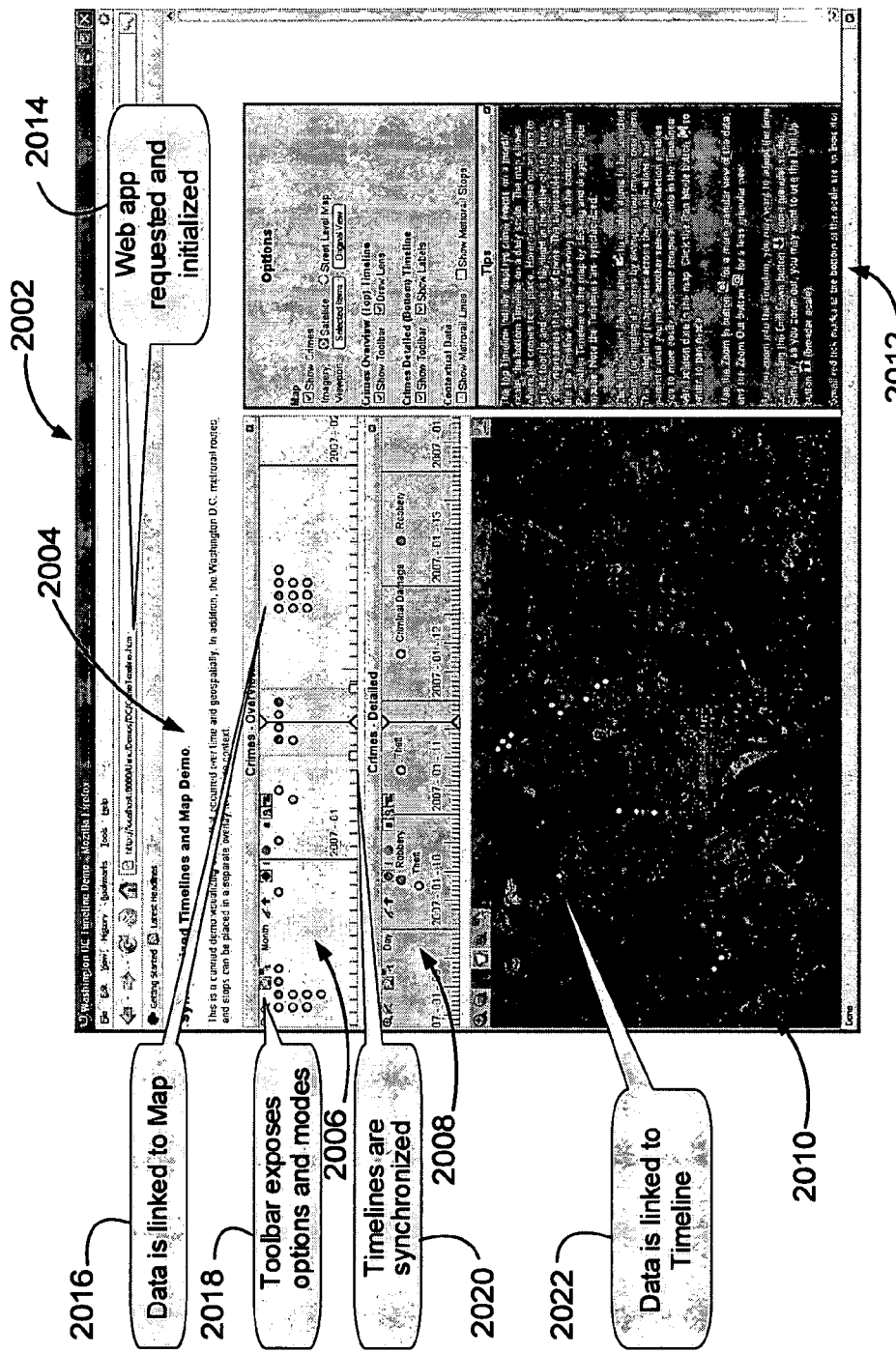
FIG. 20 is a screen shot of one example of a display of data on two timelines and a map that are linked together.

FIG. 20 is a screen shot 2002 of one example of a display of data on two timelines 2006, 2008 and a map 2010 that are linked together. A web application 2014 may be requested and initialized via a URL. The downloaded data may then be displayed in the timelines 2006 and 2008 that are linked to one another and to the map 2010. (see action 2016). A toolbar may be used to expose options and modes (see action 2018). The two timelines 2006 and 2008 are synchronized (see action 2020). Thus, any actions taken with regard to the data displayed in timeline 2006 are correspondingly depicted in timeline 2008. Data in the map 2010 is also linked to the timelines 2006 and 2008 (see action 2022). Options and tips 2012 may also be displayed.

Figure 21:
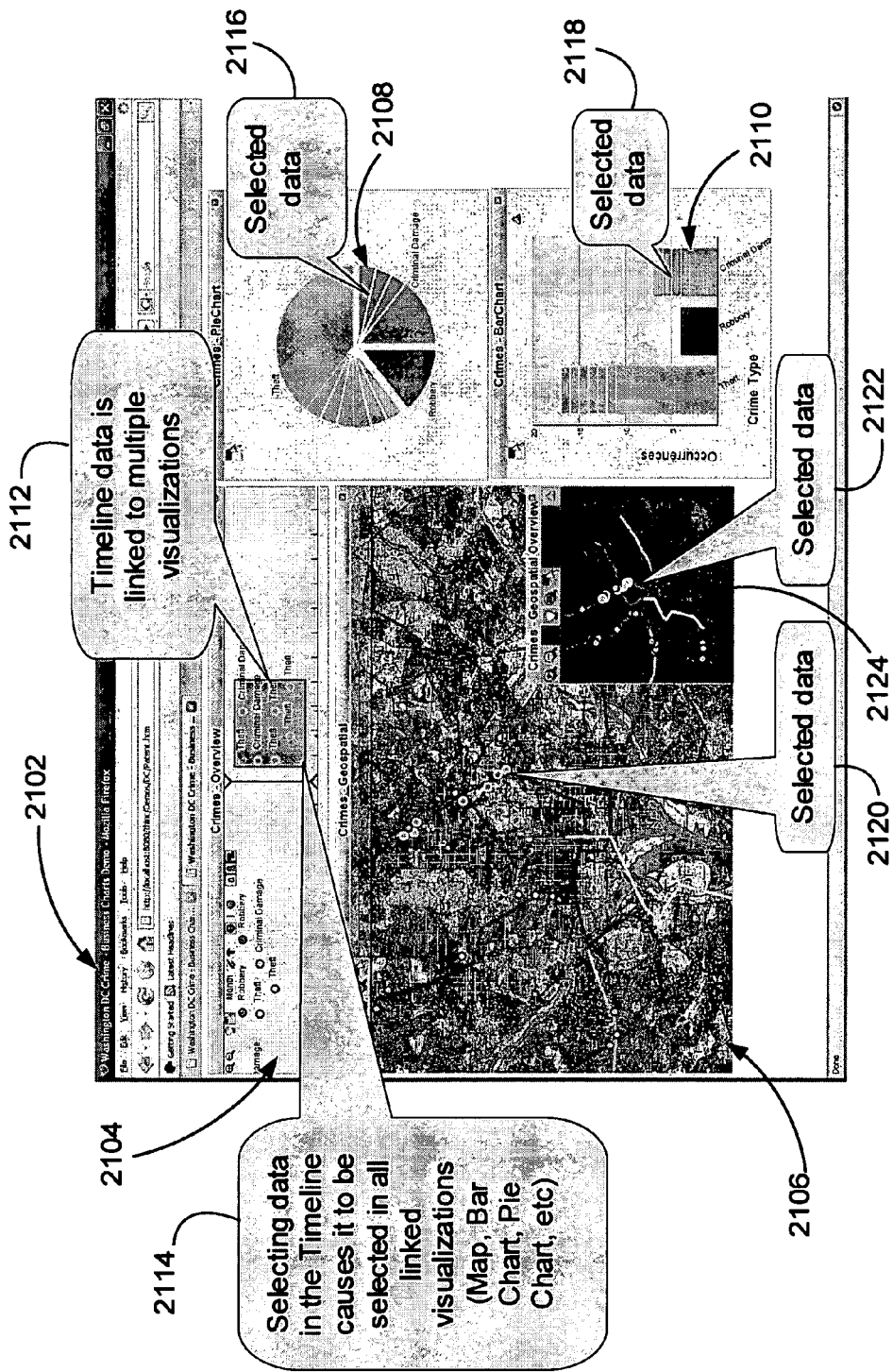
FIG. 21 is a screen shot of another example of a display of data on a timeline, a map, a pie chart, and a bar chart that are all linked together.

FIG. 21 is a screen shot 2102 of another example of a display of data on a timeline 2104, a map 2106, a pie chart 2108, and a bar chart 2110 that are all linked together. The timeline data 2112 is linked to data in multiple visualizations, such as the map 2106, the pie chart 2108, and the bar chart 2110. Selecting data in the timeline 2104 causes it to be selected in all linked visualizations, such as selected data 2120 in the map 2106, selected data 2122 in the more detailed map 2124, selected data 2116 in the pie chart 2108, and selected data 2118 in the bar chart 2110.

Figure 22:
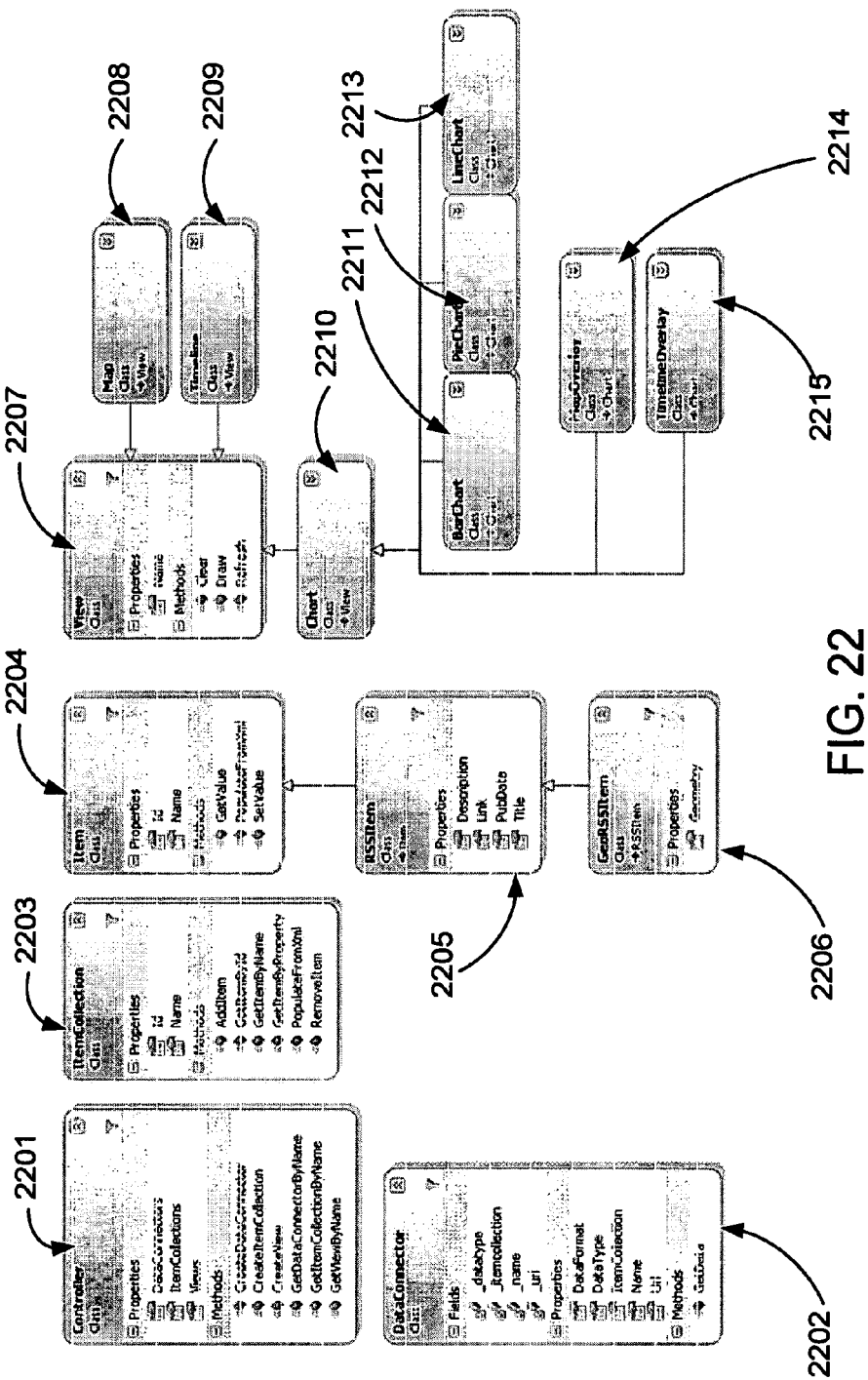
FIG. 22 is a thin client interface class diagram that is used to build web applications.

FIG. 22 is a thin client interface class diagram that is used to build web applications. In this embodiment, the depicted thin client interface may have the following classes: controller class 2201, dataconnector class 2202, itemcollection class 2003, item class 2004, RSSitem class 2205, GeoRSSitem class 2206, view class 2207, map class 2208, timeline class 2209, chart class 2210, barchart class 2211, piechart class 2212, linechart 2213, mapoverlay class 2214, and timelineoverlay class 2215. The thin client interface may operate as described previously. It is to be understood that other classes may be included and that not all of the depicted classes may be utilized in various applications.

A further feature that may be implemented in the above-described display of temporal data in a timeline and in other visualizations according to the present method and apparatus is event aging. In one embodiment this feature may be used with real-time data. In this example, each element of real-time data may refer to an event. When a new event occurs, it can be set to age off the Timeline after a given amount of time. As it ages, it will become more and more transparent giving the impression that it is fading away.

Figure 23:
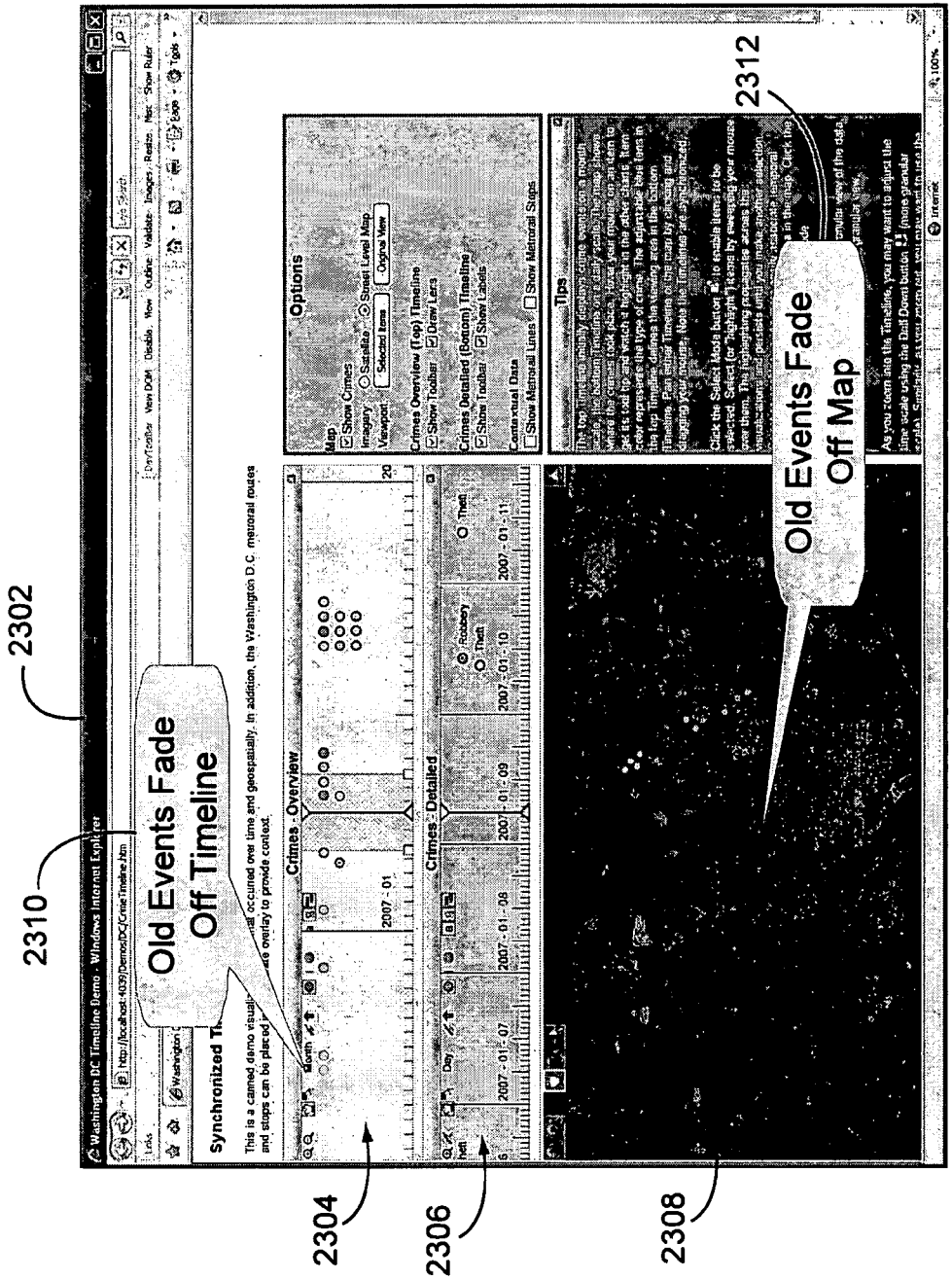
FIG. 23 is a screen shot of one example of an event aging feature according to the present method and apparatus.

FIG. 23 is a screen shot 2302 of one example of an event aging feature according to the present method and apparatus. Depicted in the screen shot 2302 are first and second timelines 2304, 2306, and a map 2308 for temporal data. With the event aging feature old events fade off the timeline (see action 2310) just as old events fade off the map (see action 2312). The effect is that as time goes by a respective temporal data element displayed in the timelines and in the map fade until they disappear.

Figure 24:
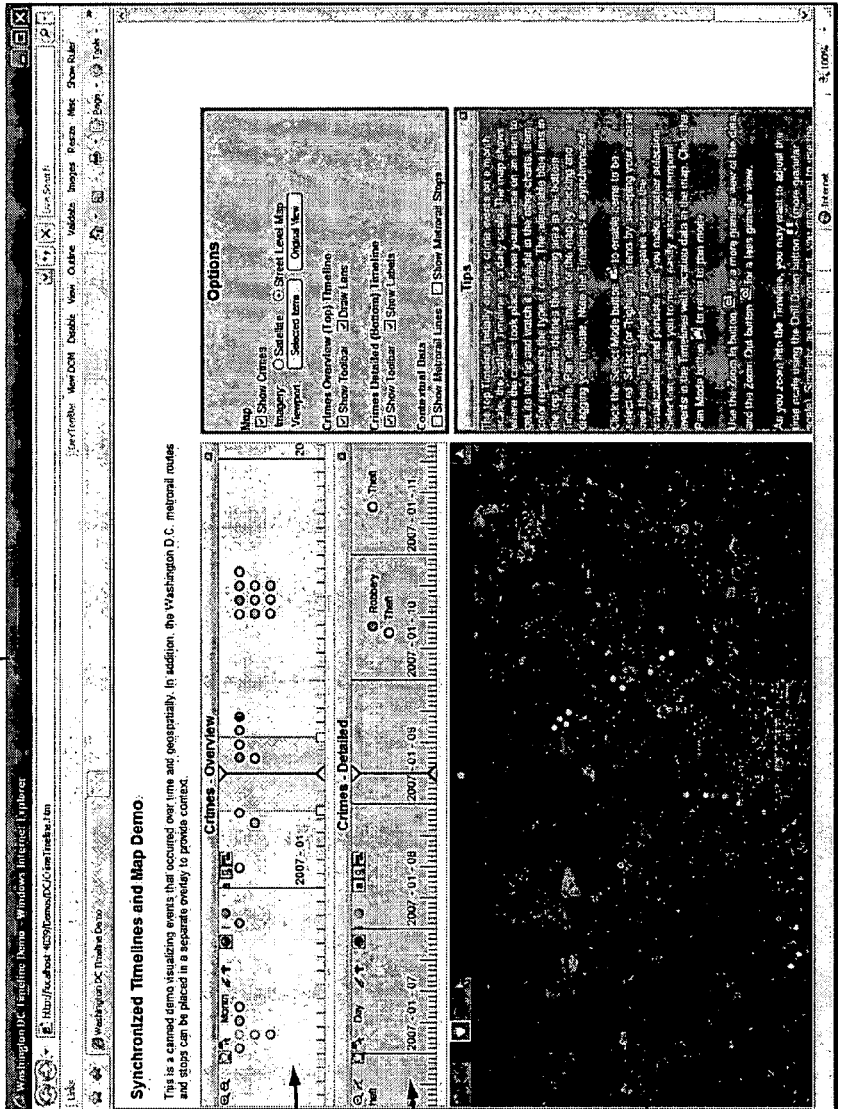
FIGS. 24-26 are a series of screen shots of another example depicting the eventual disappearance of items on a timeline.
Figure 25:
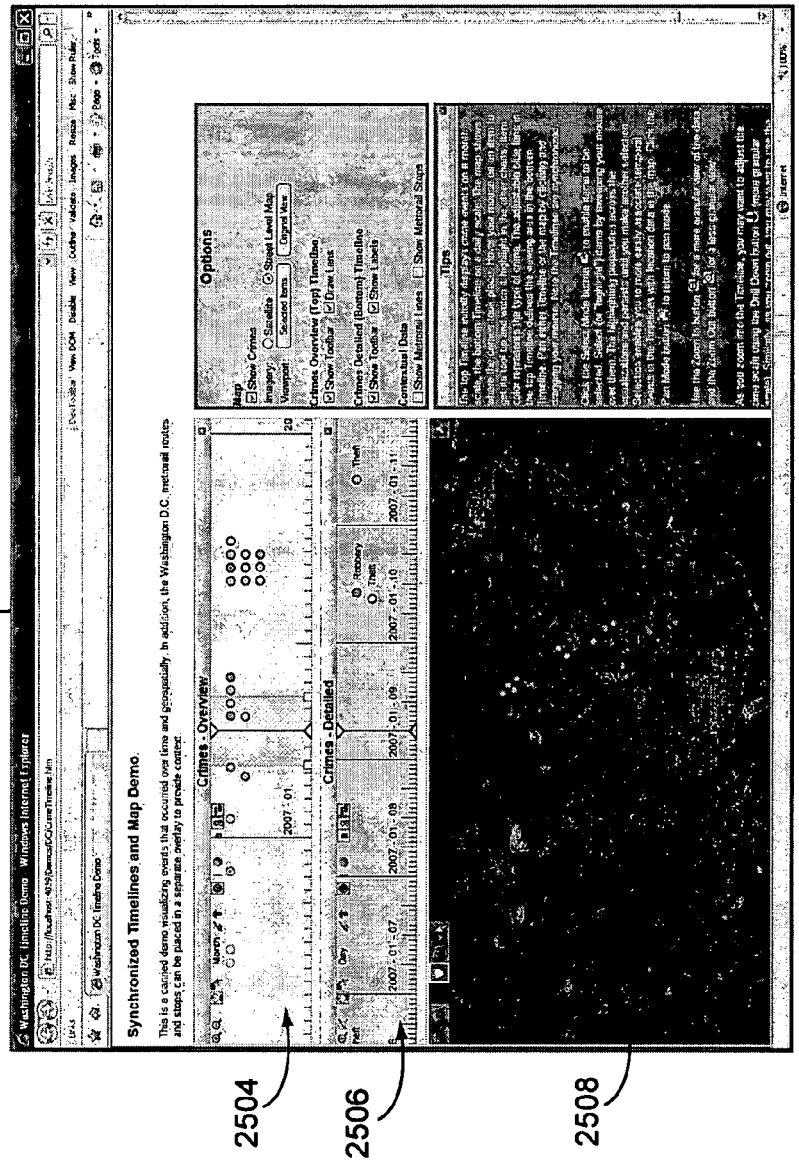
Figure 26:
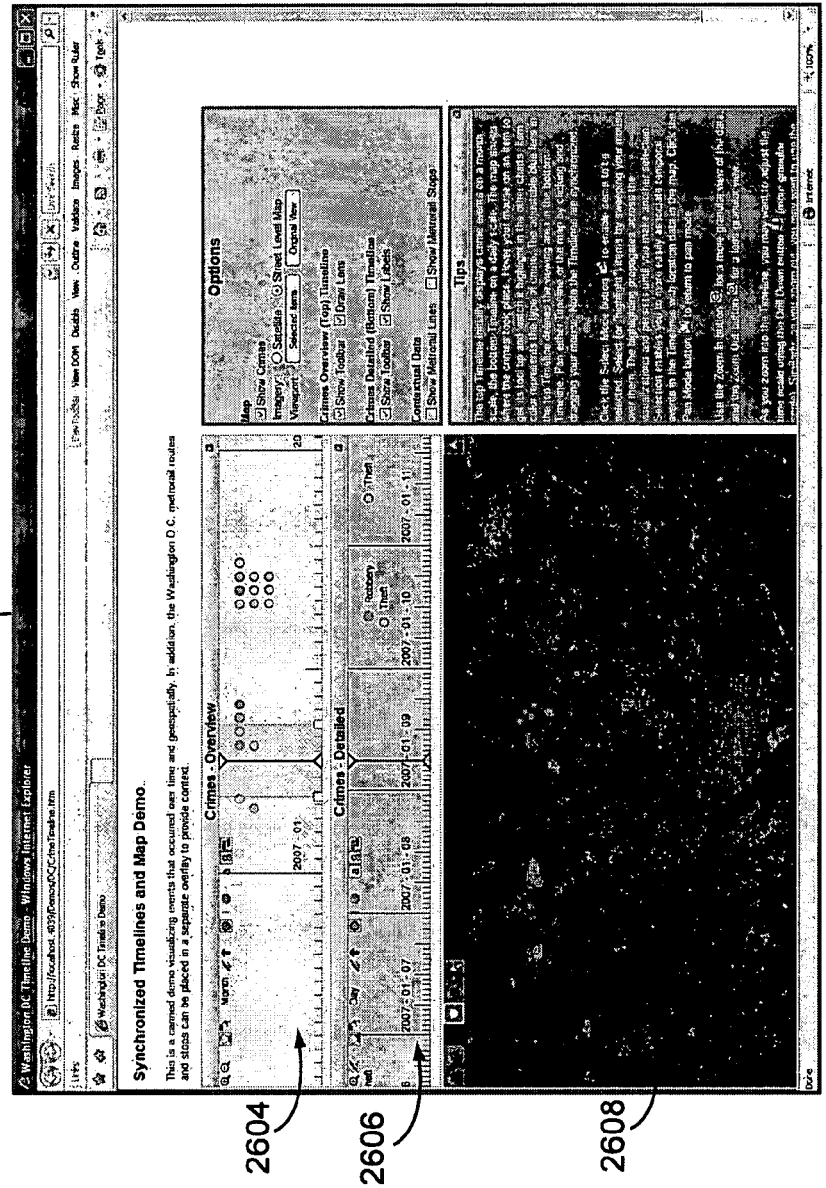

FIGS. 24-26 are a series of screen shots of another example depicting the eventual disappearance items on a timeline. Depicted in each of the screen shots 2402, 2502, 2602 is a first timeline 2404, 2504, 2604, a second timeline 2406, 2506, 2606, and a map 2408, 2508, 2608 for temporal data. It can be seen that as temporal data elements age they gradually fade out in the respective temporal data visualizations.

A further feature that may be implemented in the above-described display of temporal data in a timeline and in other visualizations according to the present method and apparatus is event replay. Using the event replay feature, temporal data may be replayed on the timeline in the order they occurred. The standard features like pause, fast forward, rewind, etc. may all be supported.

Figure 27:
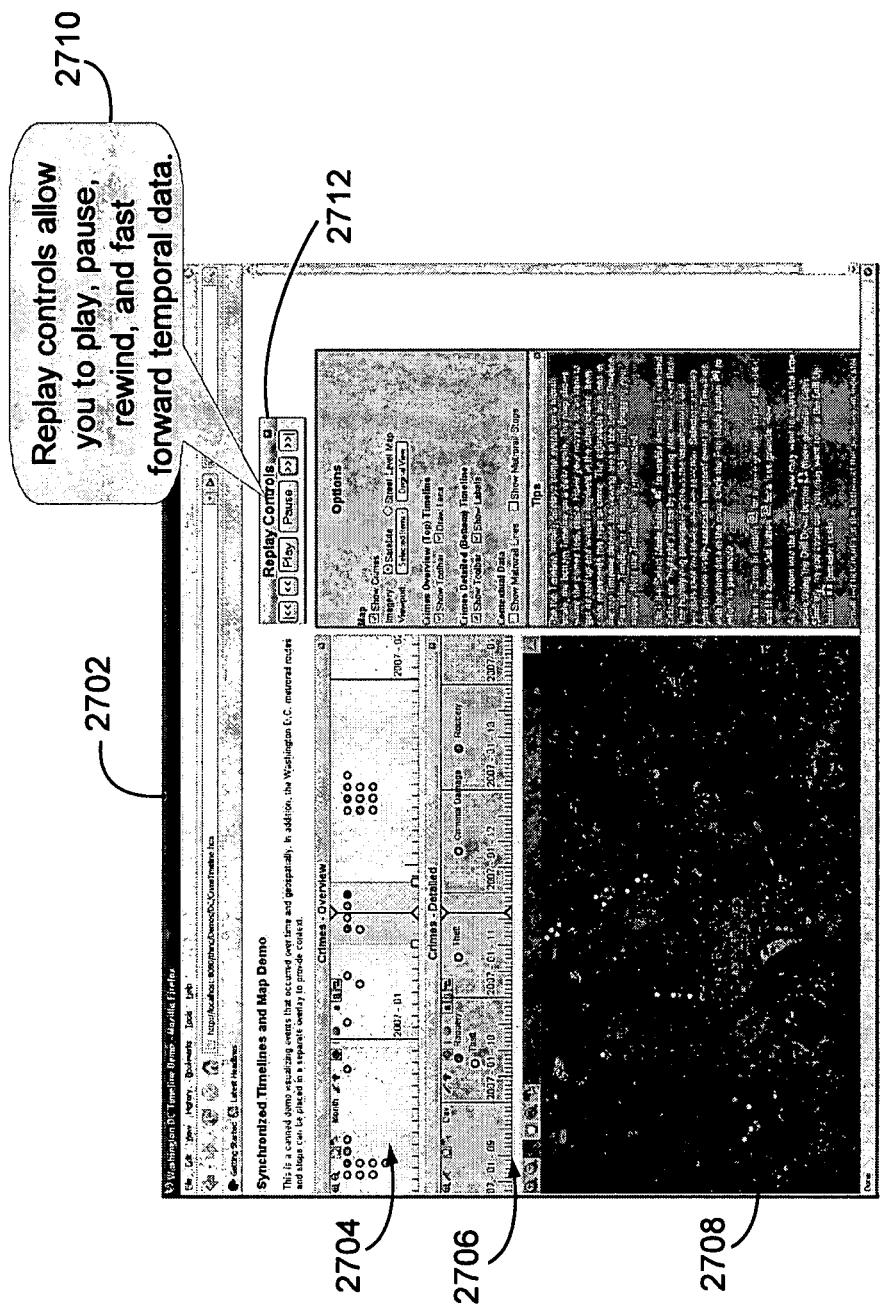
FIG. 27 is a screen shot of one example of an event replay feature according to the present method and apparatus.

FIG. 27 is a screen shot 2702 of one example of an event replay feature according to the present method and apparatus. Depicted in the screen shot 2702 are first and second timelines 2704, 2706, and a map 2708 for temporal data. With the event replay feature changes in the temporal data in each of the first and second timelines 2704, 2706, and the map 2708 may be replayed in order, for example, to more closely analyze the data. The web page in the screen shot 2702 may have displayed controls 2712 that allow a user to play, pause, rewind, and fast forward the display of temporal data (see action 2710).

The features of event aging and event replay may be implemented in a manner similar to that of the other features of timelines in web pages of thin clients as described above.

A further feature that may be implemented in the above-described display of temporal data in a timeline and in other visualizations according to the present method and apparatus is a toolbar button that effects panning of timeline data to the current time.

A further feature that may be implemented in the above-described display of temporal data in a timeline and in other visualizations according to the present method and apparatus is an optimized view on the timeline of selected data points, such as automatically setting scale, zoom level, etc to show an optimal view of a selected subset of data points.

The present apparatus in one example may comprise a plurality of components such as one or more of electronic components, hardware components, and computer software components. A number of such components may be combined or divided in the apparatus.

The present apparatus in one example may employ one or more computer-readable signal-bearing media. The computer-readable signal-bearing media may store software, firmware and/or assembly language for performing one or more portions of one or more embodiments. The computer-readable signal-bearing medium in one example may comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method comprising:
   obtaining temporal data;
   displaying the temporal data in at least one timeline on a web page in a web browser and in at least one other visualization in the web page of the web browser concurrently, wherein the at least one timeline is a drawing, wherein at least two different times and data associated with those times are plotted against one another on the at least one timeline, and
   wherein the at least two different times on the at least one timeline are represented by points located on a line,
   wherein the temporal data is displayed in at least first and second timelines concurrently on the web page of the web browser,
   wherein the first and second timelines have different time scales, and wherein the at least one timeline is synchronized with other timelines on the common web page in the web browser so that the timelines pan at a common rate;
   linking the displayed data in at least one timeline with the displayed data in the at least one other visualization such that a change in the display of temporal data of a portion thereof in the at least one timeline is synchronized with the display of temporal data in the at least one other visualizations;
   providing a best fit algorithm wherein the timeline by default uses a best fit algorithm so that data items, including date ranges, icons, and text labels of the data items, do not overlap each other; and
   scaling the temporal data such that when a large amount of data needs to be shown at a given date, an "over plotting" indicator is shown rather than stacking all of the data on top of each other.

2. The method according to claim 1, wherein the temporal data is interactive.

3. The method according to claim 1, wherein the at least one timeline is displayed in a web browser in a thin client.

4. The method according to claim 1, wherein the method further comprises interactive panning and zooming of the temporal data in the first and second timelines without refreshing the web page.

5. The method according to claim 1, wherein the at least one timeline is synchronized with all other timelines and visualizations of the temporal data.

6. The method according to claim 1, wherein the at least one timeline is synchronized with the other visualizations of the temporal data.

7. The method according to claim 1, wherein the at least one timeline is displayable in a plurality of display modes.

8. The method according to claim 1, wherein the temporal data is displayed in a web page, and wherein the method further comprises selectively displaying specific data elements in the temporal data without refreshing the web page.

9. The method according to claim 1, wherein the method further comprises selectively highlighting specific data elements in the displayed temporal data without refreshing the web page.

10. The method according to claim 1, wherein the method further comprises using a toolbar in the web browser to interact in real time with the temporal data in the at least one timeline.

11. The method according to claim 1, wherein the temporal data is formatable in any one of a plurality of standard formats.

12. An apparatus, comprising:
    a controller having a data connector for inputting temporal data, and an item collection for providing timelines and overlays, and for providing linked visualizations of the temporal data in a timeline to other visualizations of the temporal data such that a change in the display of temporal data of a portion thereof in the at least one timeline is synchronized with the display of temporal data in the at least one other visualizations,
    wherein the at least one timeline is a drawing,
    wherein at least two different times and data associated with those times are plotted against one another on the at least one timeline,
    wherein the at least two different times on the at least one timeline are represented by points located on a line,
    a display for concurrently displaying the timeline and overlays, and the linked visualizations,
    wherein the temporal data is displayed in at least first and second timelines concurrently on the display,
    wherein the first and second timelines have different time scales, and wherein the at least one timeline is synchronized with other timelines on the common display so that the timelines pan at a common rate, best fit algorithm wherein the timeline by default uses a best fit algorithm so that data items, including date ranges, icons, and text labels of the data items, do not overlap each other, and a visual scalability function wherein when a large amount of data needs to be shown at a given date, an "over plotting" indicator is shown rather than stacking all of the data on top of each other.

13. The apparatus according to claim 12, wherein a respective timeline is instantiated by giving the respective timeline a name and an element identification for where the respective timeline is to be placed on a respective web page.

14. The apparatus according to claim 13, wherein the respective timeline is given a start date, an end date, and a time scale to be used as default values when the respective timeline loads in the respective web page.

15. A method comprising:
obtaining temporal data by a thin client from a server;
displaying the temporal data in at least one timeline in a web page in a web browser and in at least one other visualization in the web browser concurrently, wherein the at least one timeline is a drawing,
wherein at least two different times and data associated with those times are plotted against one another on the at least one timeline,
wherein the at least two different times on the at least one timeline are represented by points located on a line, and
wherein the temporal data is displayed in at least first and second timelines on the web page of the web browser,
wherein the first and second timelines have different time scales, and wherein the at least one timeline is synchronized with other timelines on a common web page in the web browser so that the timelines pan at a common rate; and
linking the displayed data in the at least one timeline with the displayed data in the at least one other visualization such that a change in the display of temporal data of a portion thereof in the at least one timeline is synchronized with the display of temporal data in the at least one other visualizations,
providing a best fit algorithm wherein the timeline by default uses a best fit algorithm so that data items, including date ranges, icons, and text labels of the data items, do not overlap each other; and
scaling the temporal data such that when a large amount of data needs to be shown at a given date, an "over plotting" indicator is shown rather than stacking all of the data on top of each other.

16. The method according to claim 15, wherein the temporal data in the timeline is synchronized to the temporal data in each of the other visualizations of the temporal data such that a change in the display of temporal data of a portion thereof in one of the timeline and other visualizations is effected in each of the other visualizations of the temporal data.

17. The method according to claim 15, wherein the method further comprises interactive panning and zooming of the temporal data in the first and second timelines without refreshing the web page.

18. The method according to claim 15, wherein the method further comprises selectively displaying specific data elements in the temporal data without refreshing the web page.

19. The method according to claim 15, wherein the method further comprises selectively highlighting specific data elements in the displayed temporal data without refreshing the web page.

20. The method according to claim 15, wherein each element of temporal data corresponds to an event on a respective timeline, and wherein when a new event occurs, the new event is set to age off the respective timeline after a given amount of time.

21. The method according to claim 20, wherein as the new event ages, a display of the new event will become more transparent.

22. The method according to claim 15, wherein the temporal data is replayable on a respective timeline in an order in which the temporal data occurred.

23. The method according to claim 22, wherein standard features comprising at least one of pause, fast forward, rewind, and play are accessible from the web page.

24. An apparatus, comprising:
a controller having a data connector for inputting temporal data, and an item collection for providing timelines and overlays, and for providing linked visualizations of the temporal data in at least a first and a second timelines concurrently to other visualizations of the temporal data, such that a change in the display of temporal data of a portion thereof in the at least one timeline is synchronized with the display of temporal data in the at least one other visualizations,
wherein the first and second timelines are drawings,
wherein each of the first and second timelines is each separately plotted for at least two different times and data associated with those times,
wherein time on each of the first and second timelines is represented by points along one or more lines,
wherein the first and second timelines have different time scales, and wherein the time scale of one of the timelines is selected from the group consisting of year, month, day, hour, minute, and second;
a web browser for concurrently displaying the timeline and overlays, and the linked visualizations in a single display view,
wherein the at least one timeline is synchronized with other timelines on the common web page in the web browser so that the timelines pan at a common rate,
a best fit algorithm wherein the timeline by default uses a best fit algorithm so that data items, including date ranges, icons, and text labels of the data items, do not overlap each other, and
a visual scalability function wherein when a large amount of data needs to be shown at a given date, an "over plotting" indicator is shown rather than stacking all of the data on top of each other.

25. The apparatus according to claim 24, wherein the apparatus further comprises visualizations of the timeline, overlays and the linked visualizations running in the web browser with no installation.

26. The apparatus according to claim 24, wherein the apparatus further comprises a function of interactive panning and zooming without refreshing a current page of the web browser.

27. The apparatus according to claim 26, wherein the apparatus further comprises an automatic generation of new tiles for a timeline background.

28. The apparatus according to claim 24, wherein the apparatus further comprises different time scales that are at least one of year, month, day, hour, minute, and second.

29. The apparatus according to claim 24, wherein the apparatus further comprises a lens drawable on one timeline of the multiple timelines which represents an amount of time shown on the other timelines of the multiple timelines to thereby provide a summary and detail view of same data using two different timelines of the multiple timelines at different scales.

30. The apparatus according to claim 24, wherein the apparatus further comprises
an RSS support function for handling data that has an RSS format.

31. The apparatus according to claim 24, wherein the apparatus further comprises a linked to other visualizations function wherein data on a timeline is automatically linked to other visualizations that display the same data, and wherein if underlying data is changed, respective data, associated with the underlying data, appears differently in each of the visualizations of the data.

32. The apparatus according to claim 24, wherein the apparatus further comprises data display modes wherein data items on the timeline are displayed as at least one of circles, tick marks, spheres, and any custom icon.

33. The apparatus according to claim 32, wherein the data display modes further display ranges if an associated event occurred from a start date to an end date.

34. The apparatus according to claim 24, wherein the apparatus further comprises a selection function wherein data items of linked data in a respective visualization are selected by at least one of clicking on the data items or by doing a sweep rectangle select.

35. The apparatus according to claim 34, wherein the apparatus further comprises Wherein every other visualization that is using the linked data also automatically changes a visualization of data items of the linked data as well.

36. The apparatus according to claim 24, wherein the apparatus further comprises a highlighting function wherein data items of linked data in a respective visualization are selected by at least one of clicking on the data items or by doing a sweep rectangle select.

37. The apparatus according to claim 24, wherein the timeline further has a very rich API that allows a setting of a variety of properties using an application programmer's interface.

38. The apparatus according to claim 24, wherein the apparatus further comprises a toolbar that is built into the toolbar and that allows use of timeline features, and wherein the toolbar has tooltips and buttons that are interactive, and wherein the tooltips and buttons can be toggled off interactively or programmatically.

39. The apparatus according to claim 24, wherein the apparatus further comprises an Y axis plotting function wherein the timeline is switchable from a best fit to Y axis plotting of the data items, such that data items are plottable by using time along the x axis and anther property along the Y axis.

40. The apparatus according to claim 24, wherein the apparatus further comprises an event aging function wherein the function is useable with real-time data, each element of real-time data referring to an event, and wherein, when a new event occurs, the new event can be set to age off the timeline after a given amount of time whereby, as the new event ages, the new event becomes more transparent giving an impression that the new event is fading away.

41. The apparatus according to claim 24, wherein the apparatus further comprises an event replay function wherein temporal data is replayable on the timeline in an order that the temporal data occurred.

42. The apparatus according to claim 24, wherein the apparatus further comprises a toolbar button that effects panning of timeline data to a current time.

43. The apparatus according to claim 24, wherein the apparatus further comprises an optimized view on the timeline of selected data points.

44. The apparatus according to claim 43, wherein the optimized view comprises automatically setting at least one of scale and zoom level to show an optimal view of a selected subset of data points.

45. The method according to claim 1, wherein the line on which lie the points that represent the two different times on the at least one timeline is a straight line.

46. The method according to claim 1, wherein the at least one other visualization is other than a timeline.

47. The apparatus according to claim 12, wherein the line on which lie the points that represent the two different times on the at least one timeline is a straight line.

48. The apparatus according to claim 12, wherein the at least one other visualization is other than a timeline.

49. The method according to claim 15, wherein the line on which lie the points that represent the two different times on the at least one timeline is a straight line.

50. The method according to claim 15, wherein the at least one other visualization is other than a timeline.

51. The apparatus according to claim 24, wherein the line on which lie the points that represent the two different times on the at least one timeline is a straight line.

52. The apparatus according to claim 24, wherein the at least one other visualization is other than a timeline.

* * * * *